US012412526B2

(12) United States Patent
Lee et al.

(10) Patent No.: US 12,412,526 B2
(45) Date of Patent: Sep. 9, 2025

(54) PIXEL CIRCUIT AND DISPLAY DEVICE INCLUDING THE SAME

(71) Applicant: LG Display Co., Ltd., Seoul (KR)

(72) Inventors: Hyun Soo Lee, Paju-si (KR); Sung Ho Hong, Paju-si (KR); Se Jin Shin, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 123 days.

(21) Appl. No.: 18/491,197

(22) Filed: Oct. 20, 2023

(65) Prior Publication Data

US 2024/0203348 A1 Jun. 20, 2024

(30) Foreign Application Priority Data

Dec. 19, 2022 (KR) ........................ 10-2022-0177915

(51) Int. Cl.
*G09G 5/00* (2006.01)
*G09G 3/20* (2006.01)
*G09G 3/3233* (2016.01)

(52) U.S. Cl.
CPC ......... *G09G 3/3233* (2013.01); *G09G 3/2007* (2013.01); *G09G 2300/0819* (2013.01); *G09G 2300/0842* (2013.01); *G09G 2310/0262* (2013.01); *G09G 2310/08* (2013.01); *G09G 2320/0233* (2013.01); *G09G 2320/0257* (2013.01); *G09G 2320/045* (2013.01); *G09G 2320/064* (2013.01); *G09G 2330/021* (2013.01)

(58) Field of Classification Search
None
See application file for complete search history.

(56) References Cited

U.S. PATENT DOCUMENTS

2010/0013816 A1* 1/2010 Kwak ................. G09G 3/3233
345/76

FOREIGN PATENT DOCUMENTS

KR 10-2017-0123388 A 11/2017

* cited by examiner

*Primary Examiner* — Carl Adams
(74) *Attorney, Agent, or Firm* — Fenwick & West LLP

(57) ABSTRACT

The present disclosure relates to a pixel circuit and a display device including the same. The pixel circuit includes: a first voltage node; a second voltage node; a driving element including a first electrode to which a pixel driving voltage is applied, a gate electrode connected to a first node, and a second electrode connected to a second node; a light emitting element including an anode electrode and a cathode electrode and configured to be driven by a current from the driving element, a capacitor connected between the first node and the second node; a first switch element connected between a data line to which a data voltage is applied and the first node and turned on in response to a first gate signal; and a second switch element connected between the second node and the second voltage node and turned on in response to a second gate signal.

16 Claims, 14 Drawing Sheets

PIXEL CIRCUIT AND DISPLAY DEVICE INCLUDING THE SAME

CROSS-REFERENCE TO RELATED APPLICATION

This application claims priority to and the benefit of Republic of Korea Patent Application No. 10-2022-0177915, filed on Dec. 19, 2022, which is hereby incorporated by reference in its entirety.

BACKGROUND

1. Field

The present disclosure relates to a pixel circuit and a display device including the same.

2. Discussion of Related Art

Electroluminescent display devices are generally classified into inorganic light emitting display devices and organic light emitting display devices according to the materials of light emitting layers. Active matrix type organic light emitting display devices include organic light-emitting diodes (hereinafter referred to as "OLEDs"), which emit light by themselves, and have fast response speeds and advantages in which light emission efficiencies, brightness, and viewing angles are high.

In the organic light-emitting display devices, the OLEDs are formed in pixels. Since the organic light-emitting display devices have fast response speeds and are excellent in light emission efficiency, brightness, and viewing angle as well as being able to exhibit a black gradation in a full black color, the organic light-emitting display devices are excellent in a contrast ratio and color reproducibility.

Pixels of an organic light emitting display (OLED) device include a pixel circuit including a driving element for driving the OLED, and a capacitor connected to the driving element.

Due to process deviation and device characteristic deviation caused by the manufacturing process of display panels, there may be deviations in the electrical characteristics of driving elements among pixels. These deviations in the electrical characteristics of the pixels may increase as the driving time of the pixels elapses. To compensate for the deviations in the electrical characteristics of the pixels, an internal compensation circuit may be added to pixel circuits of an organic light emitting display. The internal compensation circuit may sample a threshold voltage of a driving element and compensate a gate voltage of the driving element by an amount of the threshold voltage of the driving element. However, additional voltage sources and wires for setting the voltage of each node are added to the internal compensation circuit, making it difficult to design that can increase a pixel aperture ratio and a pixel per inch (PPI).

SUMMARY

The present disclosure has been made in an effort to address aforementioned necessities and/or drawbacks.

The present disclosure provides a pixel circuit that is capable of compensating in real time for variations in the electrical characteristics of a driving element and facilitating a high pixel aperture ratio and a high PPI design, and a display device including the same.

The problems or limitations to be solved or addressed by the present disclosure are not limited to those mentioned above, and other problems or limitations not mentioned will be clearly understood by those skilled in the art from the following description.

A pixel circuit according to one embodiment of the present disclosure includes: a first voltage node to which a pixel driving voltage is applied: a second voltage node to which a cathode voltage lower than the pixel driving voltage is applied: a driving element including a first electrode to which the pixel driving voltage is applied, a gate electrode connected to a first node, and a second electrode connected to a second node: a light emitting element including an anode electrode and a cathode electrode and configured to be driven by a current from the driving element, a capacitor connected between the first node and the second node: a first switch element connected between a data line to which a data voltage is applied and the first node and configured to be turned on in response to a first gate signal; and a second switch element connected between the second node and the second voltage node and configured to be turned on in response to a second gate signal. The cathode electrode of the light emitting element is connected to a second voltage node.

The first switch element includes a first electrode connected to the data line, a gate electrode to which the first gate signal is applied, and a second electrode connected to the first node. The second switch element includes a first electrode connected to the second node, a gate electrode to which the second gate signal is applied, and a second electrode connected to the second voltage node.

The pixel circuit further includes a third switch element connected between a third voltage node to which an initialization voltage is applied and the first node and configured to be turned on in response to a third gate signal.

The third switch element includes a first electrode connected to the third voltage node, a gate electrode to which the third gate signal is applied, and a second electrode connected to the first node.

The pixel circuit is configured to be driven in the order of an initialization period, a sensing period, a data writing period, and a light emission period. A voltage of the first gate signal may be generated as a pulse of a gate-on voltage synchronized with the data voltage during the data writing period, and may be a gate-off voltage during the initialization period, the sensing period, and the light emission period. A voltage of the second gate signal may be generated as a pulse of the gate-on voltage during the initialization period, and may be the gate-off voltage during the sensing period, the data writing period, and the light emission period. A voltage of the third gate signal may be generated as a pulse of the gate-on voltage during the initialization period and the sensing period, and may be the gate-off voltage during the data writing period and the light emission period. The first switch element is configured to be turned on in response to the gate-on voltage of the first gate signal during the data writing period. The second switch element is configured to be turned on in response to the gate-on voltage of the second gate signal during the initialization period. The third switch element is configured to be turned on in response to the gate-on voltage of the third gate signal during the initialization period and the sensing period.

The pixel circuit further includes a fourth switch element connected between the second node and the anode electrode of the light emitting element and configured to be turned on in response to a fourth gate signal.

The fourth switch element includes a first electrode connected to the second node, a gate electrode to which the fourth gate signal is applied, and a second electrode connected to the anode electrode of the light emitting element.

The pixel circuit is configured to be driven in the order of an initialization period, a sensing period, a data writing period, and a light emission period. A voltage of the first gate signal may be generated as a pulse of a gate-on voltage synchronized with the data voltage during the data writing period, and may be a gate-off voltage during the initialization period, the sensing period, and the light emission period. A voltage of the second gate signal may be generated as a pulse of the gate-on voltage during the initialization period, and may be a gate-off voltage during the sensing period, the data writing period, and the light emission period. A voltage of the third gate signal may be generated as a pulse of the gate-on voltage during the initialization period and the sensing period, and may be the gate-off voltage during the data writing period and the light emission period. A voltage of the fourth gate signal may be the gate-on voltage during the light emission period, and may be generated as a pulse of the gate-off voltage during the initialization period, the sensing period, and the data writing period. Each of the first to fourth switch elements is configured to be turned on in response to the gate-on voltage.

The pixel circuit further includes a fifth switch element connected between the first voltage node and the first electrode of the driving element and configured to be turned on in response to a fifth gate signal.

The pixel circuit is configured to be driven in the order of an initialization period, a sensing period, a data writing period, and a light emission period. A voltage of the first gate signal may be generated as a pulse of a gate-on voltage synchronized with the data voltage during the data writing period, and may be a gate-off voltage during the initialization period, the sensing period, and the light emission period. A voltage of the second gate signal may be generated as a pulse of the gate-on voltage during the initialization period, and may be a gate-off voltage during the sensing period, the data writing period, and the light emission period. A voltage of the third gate signal may be generated as a pulse of the gate-on voltage during the initialization period and the sensing period, and may be the gate-off voltage during the data writing period and the light emission period. A voltage of the fourth gate signal may be the gate-on voltage during the light emission period, and may be the gate-off voltage during the initialization period, the sensing period, and the data writing period. A voltage of the fifth gate signal may be the gate-on voltage during the initialization period, the sensing period, the data writing period, and the light emission period, or the gate-on voltage during the initialization period, the sensing period, and the light emitting period, and may be generated as a pulse of the gate-off voltage during the data writing period. Each of the first to fifth switch elements is configured to be turned on in response to the gate-on voltage.

The data voltage may include a pixel data voltage of an input image inputted in a normal driving mode: and a preset data voltage for sensing regardless of the input image in a sensing mode. The second gate signal in the normal driving mode includes a pulse that is generated simultaneously with a pulse of the first gate signal and has the same pulse width as the pulse of the first gate signal. The second gate signal generated in the sensing mode includes a pulse that rises simultaneously with the pulse of the first gate signal and has a pulse width greater than a pulse of the first gate signal.

A pixel circuit according to another embodiment of the present disclosure includes: a first voltage node to which a pixel driving voltage is applied: a second voltage node to which a cathode voltage lower than the pixel driving voltage is applied: a driving element including a first electrode to which the pixel driving voltage is applied, a gate electrode connected to a first node, and a second electrode connected to a second node: a light emitting element including an anode electrode and a cathode electrode and configured to be driven by a current from the driving element: a capacitor connected between the first node and the second node: a first switch element connected between a data line to which a data voltage is applied and the first node and configured to be turned on in response to a first gate signal: a second switch element connected between the second node and the second voltage node and configured to be turned on in response to a second gate signal: a third switch element connected between a third voltage node to which an initialization voltage is applied and the first node and configured to be turned on in response to a third gate signal; and a fourth switch element connected between the first voltage node and the first electrode of the driving element and configured to be turned on in response to a fourth gate signal. The cathode electrode of the light emitting element is connected to the second voltage node.

The pixel circuit is configured to be driven in the order of an initialization period, a sensing period, a data writing period, and a light emission period: a voltage of the first gate signal is generated as a pulse of a gate-on voltage synchronized with the data voltage during the data writing period, and is a gate-off voltage during the initialization period, the sensing period, and the light emission period: a voltage of the second gate signal is generated as a pulse of the gate-on voltage during the initialization period, and is a gate-off voltage during the sensing period, the data writing period, and the light emission period: a voltage of the third gate signal is generated as a pulse of the gate-on voltage during the initialization period and the sensing period, and is the gate-off voltage during the data writing period and the light emission period: a voltage of the fourth gate signal is the gate-on voltage during the initialization period, the sensing period, the data writing period, and the light emission period, or the gate-on voltage during the initialization period, the sensing period, and the data writing period, and is configured to swing between the gate-on voltage and the gate-off voltage at a predetermined duty ratio during the light emission period; and each of the first to fourth switch elements is configured to be turned on in response to the gate-on voltage.

A display device according to another embodiment of the present disclosure includes: a display panel in which a plurality of data lines, a plurality of gate lines, a plurality of power lines, and a plurality of pixel circuits are disposed: a data driver configured to output data voltages of pixel data to the data lines: and a gate driver configured to sequentially supply gate signals to gate lines, wherein each of the pixel circuits includes: a first voltage node to which a pixel driving voltage is applied: a second voltage node to which a cathode voltage lower than the pixel driving voltage is applied: a driving element including a first electrode to which the pixel driving voltage is applied, a gate electrode connected to a first node, and a second electrode connected to a second node; a light emitting element including an anode electrode and a cathode electrode and configured to be driven by a current from the driving element: a capacitor connected between the first node and the second node: a first switch element connected between a data line to which the data voltage is applied and the first node and configured to be turned on in response to a first gate signal: and a second switch element connected between the second node and the second voltage node and configured to be turned on in response to a second gate signal, wherein the cathode electrode of the light emitting element is connected to the second voltage node.

The display device further includes: a third switch element connected between a third voltage node to which an initialization voltage is applied and the first node and configured to be turned on in response to a third gate signal.

The pixel circuit is configured to be driven in the order of an initialization period, a sensing period, a data writing period, and a light emission period: a voltage of the first gate signal is generated as a pulse of a gate-on voltage synchronized with the data voltage during the data writing period, and is a gate-off voltage during the initialization period, the sensing period, and the light emission period: a voltage of the second gate signal is generated as a pulse of the gate-on voltage during the initialization period, and is a gate-off voltage during the sensing period, the data writing period, and the light emission period; a voltage of the third gate signal is generated as a pulse of the gate-on voltage during the initialization period and the sensing period, and is the gate-off voltage during the data writing period and the light emission period: the first switch element is configured to be turned on in response to the gate-on voltage of the first gate signal during the data writing period; the second switch element is configured to be turned on in response to the gate-on voltage of the second gate signal during the initialization period; and the third switch element is configured to be turned on in response to the gate-on voltage of the third gate signal during the initialization period and the sensing period.

The display device further includes: a fourth switch element connected between the second node and the anode electrode of the light emitting element and configured to be turned on in response to a fourth gate signal.

The pixel circuit is configured to be driven in the order of an initialization period, a sensing period, a data writing period, and a light emission period: a voltage of the first gate signal is generated as a pulse of a gate-on voltage synchronized with the data voltage during the data writing period, and is a gate-off voltage during the initialization period, the sensing period, and the light emission period: a voltage of the second gate signal is generated as a pulse of the gate-on voltage during the initialization period, and is a gate-off voltage during the sensing period, the data writing period, and the light emission period: a voltage of the third gate signal is generated as a pulse of the gate-on voltage during the initialization period and the sensing period, and is the gate-off voltage during the data writing period and the light emission period: a voltage of the fourth gate signal is the gate-on voltage during the light emission period, and is generated as a pulse of the gate-off voltage during the initialization period, the sensing period, and the data writing period; and each of the first to fourth switch elements is configured to be turned on in response to the gate-on voltage.

The display device further includes: a fifth switch element connected between the first voltage node and the first electrode of the driving element and configured to be turned on in response to a fifth gate signal.

The pixel circuit is configured to be driven in the order of an initialization period, a sensing period, a data writing period, and a light emission period: a voltage of the first gate signal is generated as a pulse of a gate-on voltage synchronized with the data voltage during the data writing period, and is a gate-off voltage during the initialization period, the sensing period, and the light emission period: a voltage of the second gate signal is generated as a pulse of the gate-on voltage during the initialization period, and is a gate-off voltage during the sensing period, the data writing period, and the light emission period: a voltage of the third gate signal is generated as a pulse of the gate-on voltage during the initialization period and the sensing period, and is the gate-off voltage during the data writing period and the light emission period: a voltage of the fourth gate signal is the gate-on voltage during the light emission period, and is the gate-off voltage during the initialization period, the sensing period, and the data writing period: a voltage of the fifth gate signal is the gate-on voltage during the initialization period, the sensing period, the data writing period, and the light emission period, or the gate-on voltage during the initialization period, the sensing period, and the light emitting period, and is generated as a pulse of the gate-off voltage during the data writing period; and each of the first to fifth switch elements is configured to be turned on in response to the gate-on voltage.

The display area of the display panel includes a plurality of blocks that are sequentially scanned to sense current in a sensing mode; each of the blocks includes two or more pixel circuits; and the display device further comprising: a sensing circuit configured to sense, in the sensing mode, a current in a power line to which the pixel driving voltage is applied, in units of blocks divided in the display area of the display panel, wherein the data voltage includes: a pixel data voltage of an input image inputted in a normal driving mode: and a preset data voltage for sensing regardless of the input image in the sensing mode, and wherein the second gate signal in the normal driving mode includes a pulse that is generated simultaneously with a pulse of the first gate signal and has the same pulse width as the pulse of the first gate signal; and the second gate signal generated in the sensing mode includes a pulse that rises simultaneously with a pulse of the first gate signal and has a pulse width greater than a pulse of the first gate signal.

The anode electrode of the light emitting element is not applied a reference voltage.

The display device of the present disclosure includes the pixel circuit.

According to the present disclosure, since there is no need for a wiring to which a reference voltage is applied and a switch element to switch the reference voltage in the pixel circuit, it is possible to compensate for deviations in the electrical characteristics of the driving element in real time and facilitate the high pixel aperture ratio and the high PPI design.

According to this invention, it is possible to improve the lifetime of the display device and implement low power driving by compensating in real time for variations in the electrical characteristics of the driving element and eliminating the wiring for the reference voltage.

The effects of the present disclosure are not limited to the above-mentioned effects, and other effects that are not mentioned will be apparently understood by those skilled in the art from the following description and the appended claims.

BRIEF DESCRIPTION OF THE DRAWINGS

The above and other objects, features, and advantages of the present disclosure will become more apparent to those of ordinary skill in the art by describing exemplary embodiments thereof in detail with reference to the attached drawings, in which.

DETAILED DESCRIPTION

Figure 1:
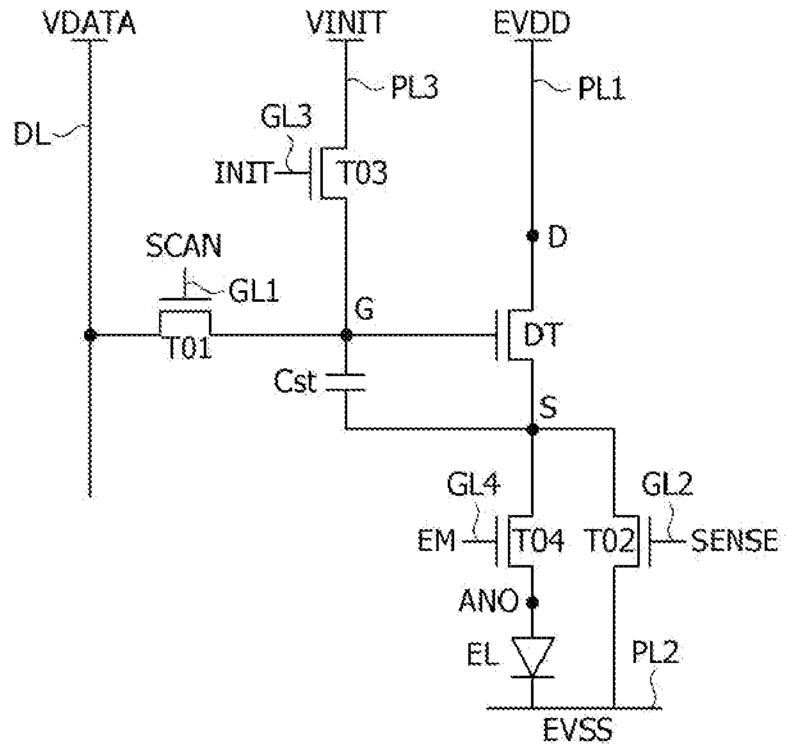
FIG. 1 is a circuit diagram illustrating a pixel circuit according to a first embodiment of the present disclosure.

The advantages and features of the present disclosure and methods for accomplishing the same will be more clearly understood from embodiments described below with reference to the accompanying drawings. However, the present disclosure is not limited to the following embodiments but may be implemented in various different forms. Rather, the present embodiments will make the disclosure of the present disclosure complete and allow those skilled in the art to completely comprehend the scope of the present disclosure. The present disclosure is only defined within the scope of the accompanying claims.

The shapes, sizes, ratios, angles, numbers, and the like illustrated in the accompanying drawings for describing the embodiments of the present disclosure are merely examples, and the present disclosure is not limited thereto. Like reference numerals generally denote like elements throughout the present specification. Further, in describing the present disclosure, detailed descriptions of known related technologies may be omitted to avoid unnecessarily obscuring the subject matter of the present disclosure.

The terms such as “comprising,” “including,” “having,” and “comprising” used herein are generally intended to allow other components to be added unless the terms are used with the term “only.” Any references to singular may include plural unless expressly stated otherwise.

Components are interpreted to include an ordinary error range even if not expressly stated.

When a positional or interconnected relationship is described between two components, such as “on top of,” “above,” “below,” “next to,” “connect or couple with,” “crossing,” “intersecting,” or the like, one or more other components may be interposed between them, unless “immediately” or “directly” is used.

When a temporal antecedent relationship is described, such as “after”, “following”, “next to”, “before”, or the like, it may not be continuous on a time base unless “immediately” or “directly” is used.

The terms “first,” “second,” and the like may be used to distinguish elements from each other, but the functions or structures of the components are not limited by ordinal numbers or component names in front of the components.

The following embodiments can be partially or entirely bonded to or combined with each other and can be linked and operated in technically various ways. The embodiments can be carried out independently of or in association with each other.

The pixel circuit and the gate drive circuit of the display device may include a plurality of transistors. The transistor may be implemented as a thin film transistor (TFT). The transistors may be implemented as an oxide thin film transistor (TFT) including an oxide semiconductor, a low temperature poly silicon TFT (LTPS TFT) including a low temperature poly silicon, and the like. Hereinafter, transistors constituting the pixel circuit and the gate driving circuit will be described focusing on an example implemented with an n-channel oxide TFT, but the present disclosure is not limited thereto.

A transistor is a three-electrode element including a gate, a source, and a drain. The source is an electrode that supplies carriers to the transistor. In the transistor, carriers start to flow from the source. The drain is an electrode through which carriers exit from the transistor. In a transistor, carriers flow from a source to a drain. In the case of an n-channel transistor, since carriers are electrons, a source voltage is a voltage lower than a drain voltage such that electrons may flow from a source to a drain. The n-channel transistor has a direction of a current flowing from the drain to the source. In the case of a p-channel transistor (p-channel metal-oxide semiconductor (PMOS)), since carriers are holes, a source voltage is higher than a drain voltage such that holes may flow from a source to a drain. In the p-channel transistor, since holes flow from the source to the drain, current flows from the source to the drain. It should be noted that a source and a drain of a transistor are not fixed. For example, a source and a drain may be changed according to an applied voltage. Therefore, the disclosure is not limited to a source and a drain of a transistor. In the following description, a source and a drain of a transistor will be referred to as a first electrode and a second electrode.

A gate signal swings between a gate-on voltage and a gate-off voltage. A transistor is turned on in response to a gate-on voltage and is turned off in response to a gate-off voltage. In the case of an n-channel transistor, the gate-on voltage may be a gate high voltage, and the gate-off voltage may be a gate low voltage.

Hereinafter, various embodiments of the present disclosure will be described in detail with reference to the accompanying drawings.

Figure 2:
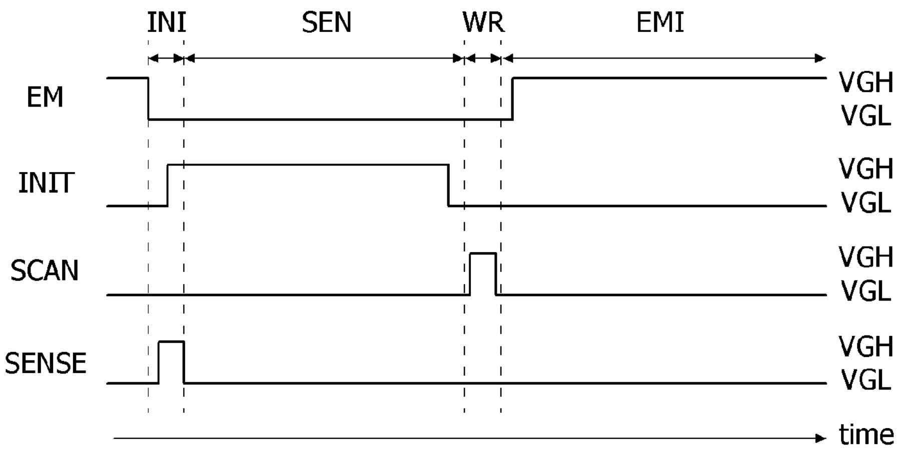
FIG. 2 is a waveform diagram illustrating gate signals applied to the pixel circuit shown in FIG. 1 and voltages at main nodes thereof according to one embodiment of the present disclosure.

FIG. 1 is a circuit diagram illustrating a pixel circuit according to a first embodiment of the present disclosure. FIG. 2 is a waveform diagram illustrating gate signals applied to the pixel circuit shown in FIG. 1 and voltages at main nodes thereof according to one embodiment of the present disclosure.

Referring to FIGS. 1 and 2, the pixel circuit includes a light emitting element EL, a driving element DT for driving the light emitting element EL, a plurality of switch elements T01 to T04, and a capacitor Cst. The driving element DT and the switch elements T01 to T04 may be implemented as n-channel oxide TFTs.

The pixel circuit is connected to a data line DL to which a data voltage VDATA is applied and gate lines GL1 to GL4 to which gate signals SCAN, SENSE, INIT, and EM are applied. The pixel circuit is connected to power nodes to which DC voltages (or constant voltages) are applied, such as a first voltage node PL1 to which a pixel driving voltage EVDD is applied, a second voltage node PL2 to which a cathode voltage EVSS is applied, and a third voltage node PL3 to which an initialization voltage VINIT is applied. On the display panel, the power lines to which the voltage nodes are connected may be commonly connected to all of pixels.

The pixel driving voltage EVDD is set to a voltage that is higher (e.g., greater) than a maximum voltage VDATA White Max of a data voltage VDATA and that enables the driving element DT to operate in a saturation region. The initialization voltage VINIT may be set to a voltage that is lower (e.g., less) than a minimum voltage VDATA Black of the data voltage VDATA and that is higher than the cathode voltage EVSS. A gate-on voltage VGH may be set to a voltage higher than the pixel driving voltage EVDD, and a gate-off voltages VGL may be set to a voltage lower than the cathode voltage EVSS. For example, the driving voltages applied to the pixels may be set to voltages that satisfy VGH>EVDD>VDATA White Max>VDATA Black>VINIT>EVSS>VGL.

The gate signals SCAN, SENSE, INIT, and EM include pulses swinging between the gate-on voltage VGH and the gate-off voltage VGL. The gate signals SCAN, SENSE, INIT, and EM include a first gate signal SCAN, a second gate signal SENSE, a third gate signal INIT, and a fourth gate signal EM.

The pixel circuit is driven in the following order: an initialization period INI, sensing period SEN, data writing period WR, and light emission period EMI. The initialization period INI, the sensing period SEN, the data writing period WR, and the light emission period EMI may be determined by waveforms of the gate signals SCAN, SENSE, INIT, and EM as shown in FIG. 2.

The voltage of the first gate signal SCAN is generated as a pulse of the gate-on voltage VGH synchronized with the data voltage VDATA of the pixel data during the data writing period WR. The voltage of the first gate signal SCAN is the gate-off voltage VGL during the initialization period INI, the sensing period SEN, and the light emission period EMI. A first switch element T01 is turned on in response to the gate-on voltage VGH of the first gate signal SCAN during the data writing period WR.

The voltage of the second gate signal SENSE is generated as a pulse of the gate-on voltage VGH during the initialization period INI and is the gate-off voltage VGL during the sensing period SEN, the data writing period WR, and the light emission period EMI. A second switch element T02 is turned on in response to the gate-on voltage VGH of the second gate signal SENSE during the initialization period INI.

The voltage of the third gate signal INIT is generated as a pulse of the gate-on voltage VGH during the initialization period INI and the sensing period SEN. The voltage of the third gate signal INIT may be inverted to the gate-on voltage VGH after the fourth gate signal EM is inverted to the gate-off voltage VGL within the initialization period INI. The voltage of the third gate signal INIT is a gate-off voltage during the data writing period WR and the light emission period EMI. A third switch element T03 is turned on in response to the gate-on voltage VGH of the third gate signal INIT during the initialization period INI and the sensing period SEN.

The voltage of the fourth gate signal EM is the gate-on voltage VGH during the light emission period EMI and is generated as a pulse of the gate-off voltage VGL during the initialization period INI, the sensing period SEN, and the data writing period WR. A fourth switch element T04 is turned on in response to the gate-on voltage VGH of the fourth gate signal EM during the light emission period EMI.

The driving element DT generates a current according to its gate-source voltage Vgs to drive the light emitting element EL. The driving element DT includes a first electrode connected to a node D, a gate electrode connected to a first node G, and a second electrode connected to a second node S. The node D may be connected to the first voltage node PL1 to which the pixel driving voltage EVDD is applied.

The light emitting element EL may be implemented as an OLED. The light emitting element EL includes an anode electrode, a cathode electrode, and an organic compound layer formed between the electrodes. The anode electrode of the light-emitting element EL is connected to a third node ANO, and the cathode electrode is connected to the second voltage node PL2 to which the cathode voltage EVSS is applied. The organic compound layer may include, but is not limited to, a hole injection layer HIL, a hole transport layer HTL, a light emission layer EML, an electron transport layer ETL, and an electron injection layer EIL. When a voltage is applied to the anode and cathode electrodes of the light emitting element EL, holes passing through the hole transport layer (HTL) and electrons passing through the electron transport layer (ETL) move to the emission layer (EML) to form excitons. In this case, visible light is emitted from the light emission layer EML. The light emitting element EL may be implemented as a tandem structure with a plurality of light emitting layers stacked on top of each other. The light emitting element EL having the tandem structure may improve the luminance and lifespan of pixels.

The capacitor Cst is connected between the first node G and the second node S to store the threshold voltage Vth of the driving element DT, which is sampled during the sensing period SEN, and to maintain the gate-source voltage Vgs of the driving element DT during the light emission period EMI.

The switch elements T01 to T04 of the pixel circuit include the first switch element T01 that supplies the data voltage VDATA of pixel data to the first node G in response to the first gate signal SCAN, the second switch element T02 that connects the second node S to the second voltage node PL2 in response to the second gate signal SENSE, the third switch element T03 that supplies the initialization voltage VINIT to the first node G in response to the third gate signal INIT, and a fourth switch element T04 that connects the second node S to the third node ANO in response to the fourth gate signal EM.

The first switch element T01 is connected between the data line DL to which the data voltage VDATA is applied and the first node G. The second switch element T02 is connected between the second node S and the second voltage node PL2.

The first switch element T01 is turned on in response to the gate-on voltage VGH of the first gate signal SCAN during the data writing period WR. When the first switch element T01 is turned on, the data voltage VDATA is applied to the first node G. The first switch element T01 is turned off during the initialization period INI, the sensing period SEN, and the light emission period EMI during which the voltage of the first gate signal SCAN is the gate-off voltage VGL. The first switch element T01 includes a first electrode connected to the data line DL to which the data voltage VDATA is applied, a gate electrode connected to a first gate line GL1 to which the first gate signal SCAN is applied, and a second electrode connected to the first node G.

The second switch element T02 is turned on in response to the gate-on voltage VGH of the second gate signal SENSE during the initialization period INI. When the second switch element T02 is turned on, the second node S is connected to the second voltage node PL2 so that the voltage of the second node S is set to the cathode voltage EVSS. The second switch element T02 is turned off during the sensing period SEN, the data writing period WR, and the light emission period EMI during which the voltage of the second gate signal SENSE is the gate-off voltage VGL. The second switch element T02 includes a first electrode connected to the second node S, a gate electrode connected to a second gate line GL2 to which the second gate signal SENSE is applied, and a second electrode connected to the second voltage node to which the cathode voltage EVSS is applied.

The third switch element T03 is connected between the third voltage node PL3 to which the initialization voltage is applied and the first node G. The fourth switch element T04 is connected between the second node S and the anode electrode of the light emitting element EL.

The third switch element T03 is turned on in response to the gate-on voltage VGH of the third gate signal INIT during the initialization period INI and the sensing period SEN. When the third switch element T03 is turned on, the initialization voltage VINIT is applied to the first node G. The third switch element is turned off during the data writing period WR and the light emission period EMI during which the voltage of the third gate signal INIT is the gate-off voltage VGL. The third switch element T03 includes a first electrode connected to the third voltage node PL3 to which the initialization voltage VINIT is applied, a gate electrode connected to the third gate line GL3 to which the third gate signal INIT is applied, and a second electrode connected to the first node G.

A fourth switch element T04 is turned on in response to the gate-on voltage VGH of the fourth gate signal EM during the light emission period EMI. When the fourth switch element T04 is turned on, the second node S is connected to the third node ANO to form a current path between the first voltage node PL1 and the second voltage node PL2 so that current can flow to the light emitting element EL. The fourth switch element T04 is turned off during the initialization period INI, the sensing period SEN, and the data writing period WR during which the voltage of the fourth gate signal EM is the gate-off voltage VGL. The fourth switch element T04 includes a first electrode connected to the second node S, a gate electrode connected to a fourth gate line GL4 to which the fourth gate signals EM is applied, and a second electrode connected to the third node ANO.

Figure 3A:
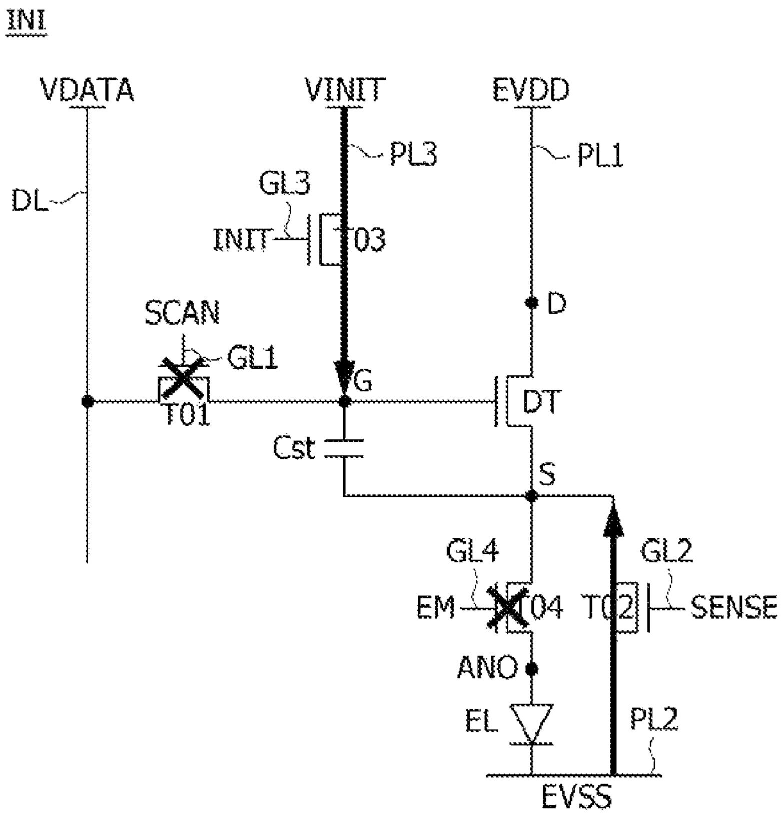
FIGS. 3A to 3D are circuit diagrams illustrating changes in current flowing in the pixel circuit in steps during an operation period of the pixel circuit shown in FIG. 2 according to one embodiment of the present disclosure.
Figure 3B:
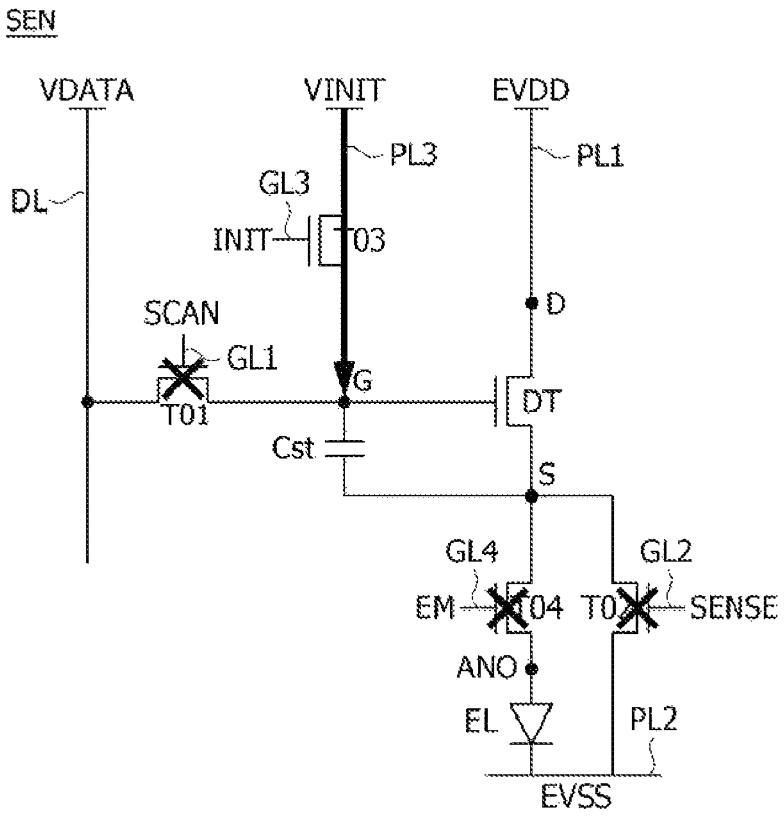
Figure 3C:
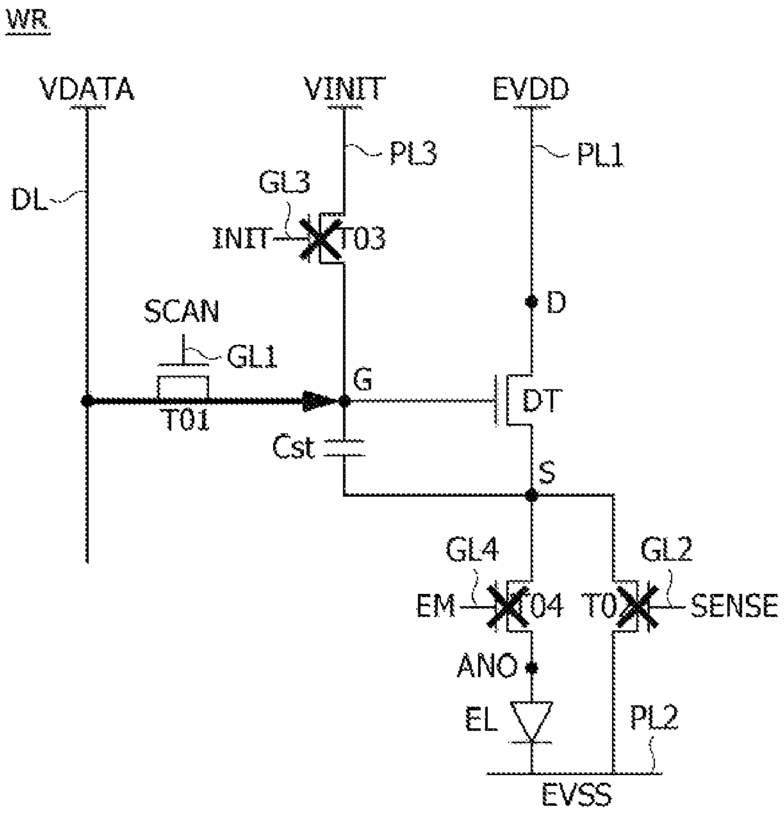
Figure 3D:
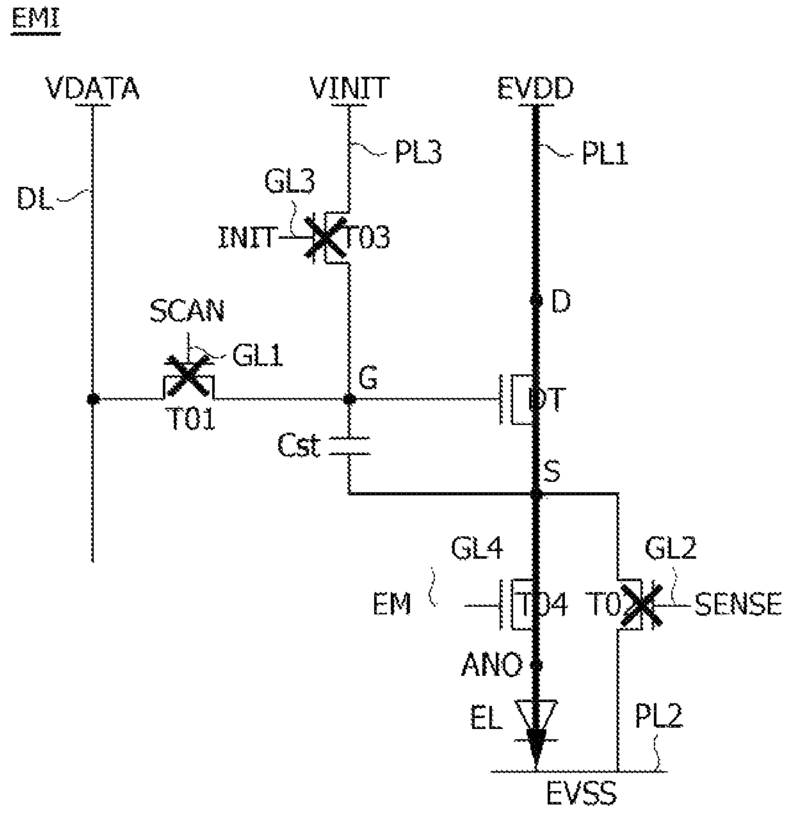

FIGS. 3A to 3D are circuit diagrams illustrating changes in current flowing in the pixel circuit in steps during an operation period of the pixel circuit shown in FIG. 2 according to one embodiment of the present disclosure. FIG. 3A is a circuit diagram illustrating the current flowing in the pixel circuit during the initialization period INI according to one embodiment of the present disclosure. FIG. 3B is a circuit diagram illustrating the current flowing in the pixel circuit during the sensing period SEN according to one embodiment of the present disclosure. FIG. 3C is a circuit diagram illustrating the current flowing in the pixel circuit during the data writing period WR according to one embodiment of the present disclosure. FIG. 3D is a circuit diagram illustrating the current flowing in the pixel circuit during the light emission period EMI according to one embodiment of the present disclosure.

Referring to FIG. 3A, during the initialization period INI, the main nodes of the pixel circuit are initialized. During the initialization period INI, the voltage of the second gate signal SENSE and the third gate signal INIT is the gate-on voltage VGH. During the initialization period INI, the voltage of the first gate signal SCAN and the fourth gate signal EM is the gate-off voltage VGL. Therefore, during the initialization period INI, the second and third switch elements T02 and T03 are turned on and the first and fourth switch elements T01 and T04 are turned off. As a result, at the end of the initialization period INI, the voltage of the first node G is initialized to the initialization voltage VINIT and the voltage of the second node S is initialized to the cathode voltage EVSS. When the voltage difference between the initialization voltage VINIT and the cathode voltage EVSS is set to a voltage higher than the threshold voltage Vth of the driving element DT, the driving element DT may be turned on in the initialization period INI. The light emitting element EL is not emitted during the initialization period INI because the voltage between the cathode electrode and the anode electrode is 0 [V].

Referring to FIG. 3B, during the sensing period SEN, the threshold voltage Vth of the driving element DT is sampled and stored in the capacitor Cst. The voltage of the third gate signal INIT is the gate-on voltage VGH during the sensing period SEN. During the sensing period SEN, the voltage of the first gate signal SCAN, the second gate signal SENSE, and the fourth gate signal EM is the gate-off voltage VGL. During the sensing period SEN, the third switch element T03 is turned on, and the other switch elements T01, T02, and T04 are turned off. During the sensing period SEN, when the voltage of the second node S rises and the gate-source voltage Vgs of the driving element DT reaches the threshold voltage Vth of the driving element DT, the driving element DT is turned off. At the end of the sensing period SEN, the voltage of the first node G is the initialization voltage VINIT and the voltage of the second node S is VINIT−Vth. Therefore, at the end of the sensing period SEN, the voltage of the capacitor Cst is the threshold voltage of the driving element DT.

Referring to FIG. 3C, during the data writing period WR, the data voltage VDATA of the pixel data is applied to the first node G and the data voltage VDATA, for which the threshold voltage Vth of the driving element DT is compensated, is stored in the capacitor Cst. During the data writing period WR, the voltage of the first gate signal SCAN is the gate-on voltage VGH, and the voltage of the second to fourth gate signals SENSE, INIT, and EM is the gate-off voltage VGL. During the data writing period WR, the first switch element T01 is turned on, and the second to fourth switch elements T02, T03, and T04 are turned off. During the data writing period WR, the data voltage VDATA is applied to the first node G through the first switch element T01. At the end of the data writing period WR, the voltage of the first node G is the data voltage VDATA, and the voltage of the second node S is VINIT−Vth. Therefore, at the end of the data writing period WR, the gate-source voltage Vgs stored in the capacitor Cst is VDATA−VINIT+Vth.

During the data writing period WR, the mobility M of the driving element DT may be compensated. For example, when the mobility of the driving element DT is large, the voltage of the second node S is increased within the data writing period WR to decrease the gate-source voltage Vgs of the driving element DT. On the other hand, when the mobility of the driving element DT is relatively small, the voltage of the second node S is decreased within the data writing period WR to increase the gate-source voltage Vgs of the driving element DT.

Referring to FIG. 3D, during the light emission period EMI, the voltage of the fourth gate signal EM is the gate-on voltage VGH and the voltage of the first to third gate signals SCAN, SENSE, and INIT is the gate-off voltage VGL. During the light emission period EMI, the fourth switch element T04 is turned on, and the first to third switch elements T01, T02, and T03 are turned off. During the light emission period EMI, the light-emitting element EL may be driven by a current flowing through the driving element DT to emit light at a brightness corresponding to a grayscale value of the pixel data. The current flowing to the light emitting element EL during the light emission period EMI is determined by the gate-source voltage Vgs of the driving element DT. During the light emission period EMI, the voltage of the first node G is VDATA+Voled, and the voltage of the second node S is VINIT−Vth+Voled. Therefore, the gate-source voltage Vgs of the driving element DT is VDATA−VINIT+Vth during the light emission period EMI. The Voled is the voltage between the anode electrode and the cathode electrode when the light emitting element EL is driven during the light emission period EMI.

During the light emission period EMI, the fourth gate signal EM may be generated as a pulse width modulation (PWM) pulse. The PWM pulse may vary its duty ratio depending on according to a digital brightness value (hereinafter referred to as 'DBV'). The PWM pulse of the fourth gate signal EM may minimize or at least reduce an after-image occurred when expressing a low grayscale and improve the luminance uniformity of the low grayscale by adjusting the light-on and light-off ratio of the light emitting element EL, i.e., the light emission duty, thereby enhancing the low grayscale expression capability of the pixels and reducing the leakage current of the pixels.

Figure 4:
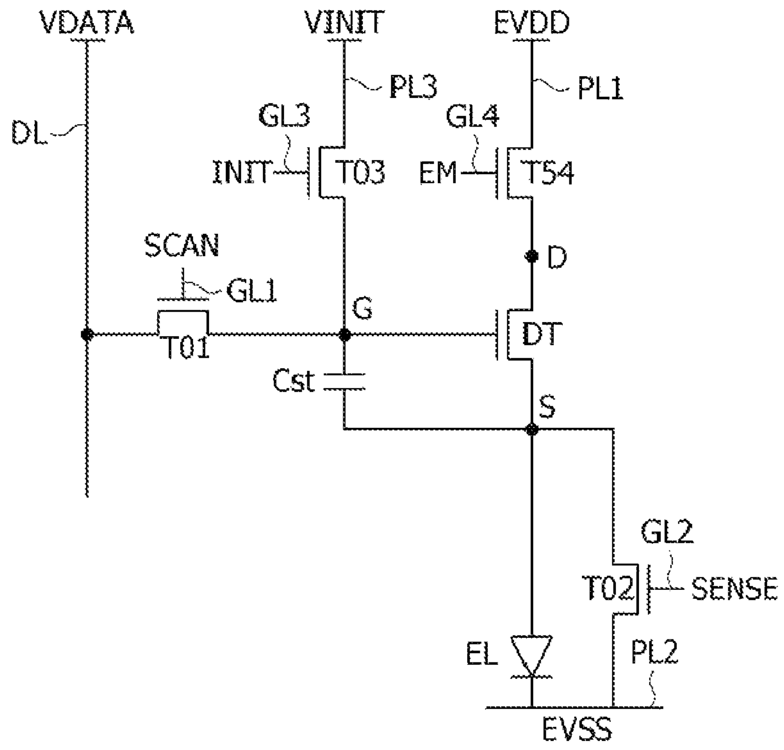
FIG. 4 is a circuit diagram illustrating a pixel circuit according to a second embodiment of the present disclosure.
Figure 5:
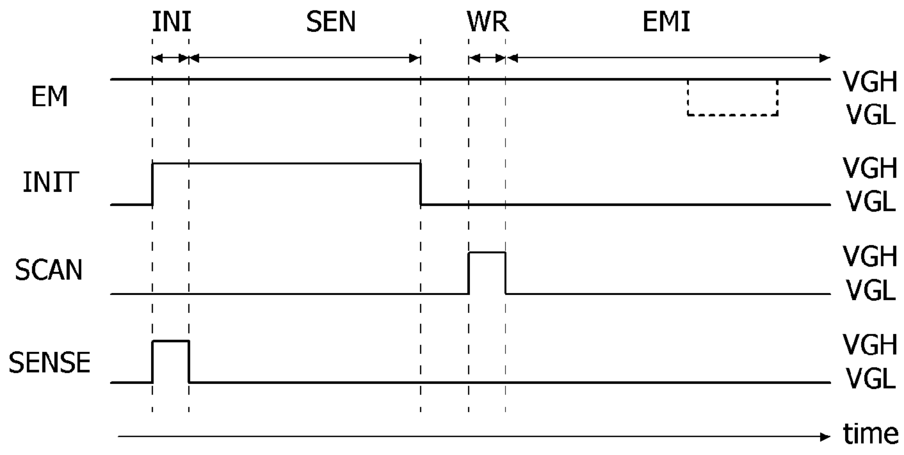
FIG. 5 is a waveform diagram illustrating gate signals applied to the pixel circuit shown in FIG. 4 and voltages at main nodes thereof according to one embodiment of the present disclosure.

FIG. 4 is a circuit diagram illustrating a pixel circuit according to a second embodiment of the present disclosure. FIG. 5 is a waveform diagram illustrating gate signals applied to the pixel circuit shown in FIG. 4 and voltages at main nodes thereof according to one embodiment of the present disclosure. In this embodiment, the same reference numerals are assigned to the components substantially the same as those of the above-described embodiment, and a detailed description thereof will be omitted.

Referring to FIGS. 4 and 5, the pixel circuit includes a light emitting element EL, a driving element DT for driving the light emitting element EL, a plurality of switch elements T01 to T54, and a capacitor Cst. The driving element DT and the switch elements T01 to T54 may be implemented as n-channel oxide TFTs.

The operation period of the pixel circuit is divided into an initialization period INI, a sensing period SEN, a data writing period WR, and a light emission period EMI. The initialization period INI, the sensing period SEN, the data writing period WR, and the light emission period EMI may be determined by waveforms of the gate signals SCAN, SENSE, INIT, and EM as shown in FIG. 5.

The voltage of a first gate signal SCAN is generated as a pulse of the gate-on voltage VGH synchronized with a data voltage VDATA of the pixel data during the data writing period WR. The voltage of the first gate signal SCAN is the gate-off voltage VGL during the initialization period INI, the sensing period SEN, and the light emission period EMI. A first switch element T01 is turned on in response to the gate-on voltage VGH of the first gate signal SCAN during the data writing period WR.

The voltage of a second gate signal SENSE is generated as a pulse of the gate-on voltage VGH during the initialization period INI and is the gate-off voltage VGL during the sensing period SEN, the data writing period WR, and the light emission period EMI. A second switch element T02 is turned on in response to the gate-on voltage VGH of the second gate signal SENSE during the initialization period INI.

The voltage of a third gate signal INIT is generated as a pulse of the gate-on voltage VGH during the initialization period INI and the sensing period SEN. The voltage of the third gate signal INIT is a gate-off voltage during the data writing period WR and the light emission period EMI. A third switch element T03 is turned on in response to the gate-on voltage VGH of the third gate signal INIT during the initialization period INI and the sensing period SEN.

During the initialization period INI, the voltage of the second to fourth gate signals SENSE, INIT, and EM is the gate-on voltage VGH. During the initialization period INI, the voltage of the first gate signal SCAN is the gate-off voltage VGL. Therefore, during the initialization period INI, the second to fourth switch elements T02, T03, and T54 are turned on, and the first switch element T01 is turned off. At the end of the initialization period INI, the voltage of a first node G is initialized to an initialization voltage VINIT and the voltage of a second node S is initialized to the cathode voltage EVSS. At this time, the gate-source voltage Vgs of the driving element DT becomes VINIT−EVSS and the driving element DT may be turned on. The light emitting element EL is not emitted during the initialization period INI because the voltage between the cathode electrode and the anode electrode is 0 [V].

During the sensing period SEN, the voltage of the third and fourth gate signals INIT and EM is the gate-on voltage VGH. During the sensing period SEN, the voltage of the first and second gate signals SCAN and SENSE is the gate-off voltage VGL. During the sensing period SEN, the third and fourth switch elements T03 and T54 are turned on, and the first and second switch elements T01 and T02 are turned off. During the sensing period SEN, when the voltage of the second node S rises and the gate-source voltage Vgs of the driving element DT reaches the threshold voltage Vth of the driving element DT, the driving element DT is turned off. At the end of the sensing period SEN, the voltage of the first node G is the initialization voltage VINIT and the voltage of the second node S is VINIT−Vth. Therefore, at the end of the sensing period SEN, the voltage of the capacitor Cst is the threshold voltage of the driving element DT.

During the data writing period WR, the voltage of the first and fourth gate signals SCAN and EM is the gate-on voltage VGH, and the voltage of the second and third gate signals SENSE and INIT is the gate-off voltage VGL. During the data writing period WR, the first and fourth switch elements T01 and T54 are turned on, and the second and third switch elements T02 and T03 are turned off. During the data writing period WR, the data voltage VDATA is applied to the first node G through the first switch element T01. At the end of the data writing period WR, the voltage of the first node G is the data voltage VDATA, and the voltage of the second node S is VINIT−Vth. Therefore, at the end of the data writing period WR, the gate-source voltage Vgs stored in the capacitor Cst is VDATA−VINIT+Vth. During the data writing period WR, the mobility M of the driving element DT may be compensated.

During the light emission period EMI, the voltage of the fourth gate signal EM may maintain the gate-on voltage VGH or may be generated as an alternating current signal that swings at the duty ratio of the PWM pulse. During the light emission period EMI, the voltage of the first to third gate signals SCAN, SENSE, and INIT is the gate-off voltage VGL. During the light emission period EMI, a fourth switch element T54 is turned on, and the first to third switch elements T01, T02, and T03 are turned off. During the light emission period EMI, the light-emitting element EL may be driven by a current flowing through the driving element DT to emit light at a brightness corresponding to a grayscale value of the pixel data.

Figure 6:
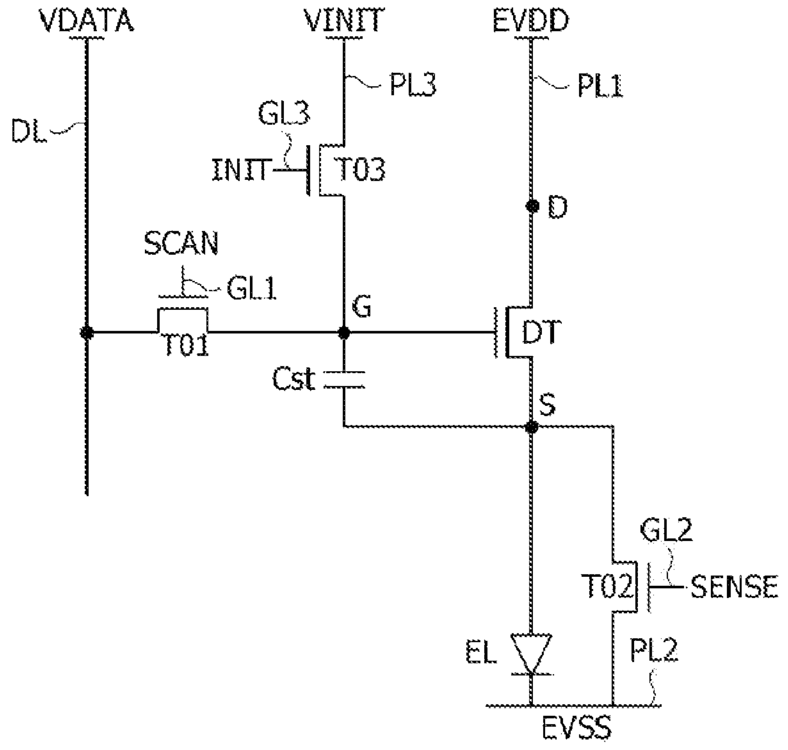
FIG. 6 is a circuit diagram illustrating a pixel circuit according to a third embodiment of the present disclosure.
Figure 7:
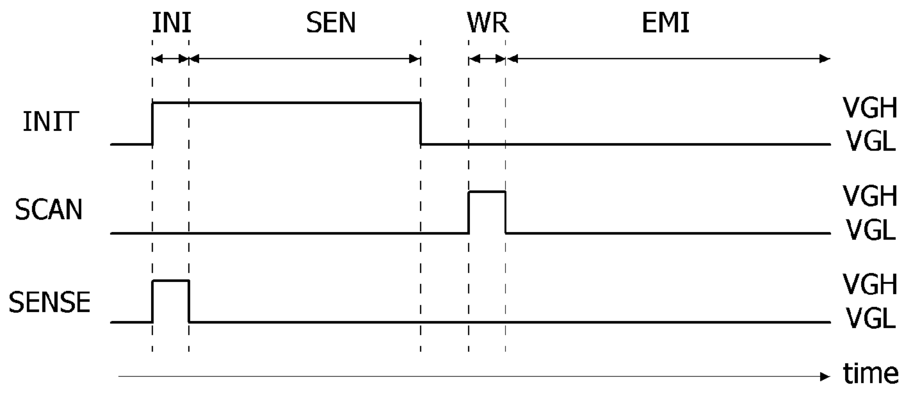
FIG. 7 is a waveform diagram illustrating gate signals applied to the pixel circuit shown in FIG. 5 and voltages at main nodes thereof according to one embodiment of the present disclosure.

FIG. 6 is a circuit diagram illustrating a pixel circuit according to a third embodiment of the present disclosure. FIG. 7 is a waveform diagram illustrating gate signals applied to the pixel circuit shown in FIG. 5 and voltages at main nodes thereof according to one embodiment of the present disclosure. In this embodiment, the pixel circuit includes three switch elements T01 to T02 without a fourth switch element.

Referring to FIGS. 6 and 7, during an initialization period INI, the voltage of second and third gate signals SENSE and INIT is the gate-on voltage VGH. During an initialization period INI, the voltage of a first gate signal SCAN is the gate-off voltage VGL. Therefore, during the initialization period INI, the second and third switch elements T02 and T03 are turned on and the first switch element T01 is turned off. At the end of the initialization period INI, the voltage of a first node G is initialized to an initialization voltage VINIT and the voltage of a second node S is initialized to the cathode voltage EVSS.

During a sensing period SEN, the voltage of a third gate signal INIT is the gate-on voltage VGH and the voltage of the first and second gate signals SCAN and SENSE is the gate-off voltage VGL. During the sensing period SEN, the third switch element T03 is turned on, and the first and second switch elements T01 and T02 are turned off. During the sensing period SEN, when the voltage of the second node S rises and the gate-source voltage Vgs of the driving element DT reaches the threshold voltage Vth of the driving element DT, the driving element DT is turned off, and the threshold voltage Vth of the driving element DT is stored in a capacitor Cst.

During a data writing period WR, the voltage of the first gate signal SCAN is the gate-on voltage VGH, and the voltage of the second and third gate signals SENSE and INIT is the gate-off voltage VGL. During a data writing period WR, the first switch element T01 is turned on, and the second and third switch elements T02 and T03 are turned off. During the data writing period WR, a data voltage VDATA is applied to the first node G through the first switch element T01.

During a light emission period EMI, the driving element DT generates a current according to the gate-source voltage Vgs. The light-emitting element EL may be driven by the current supplied through the driving element DT to emit light at a brightness corresponding to a gray scale value of the pixel data.

Figure 8:
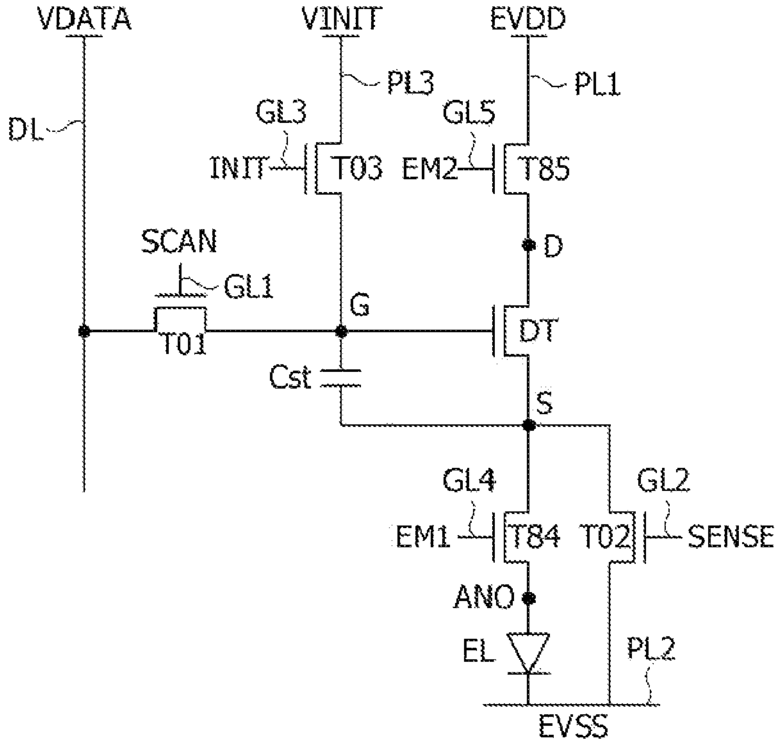
FIG. 8 is a circuit diagram illustrating a pixel circuit according to a fourth embodiment of this disclosure.
Figure 9A:
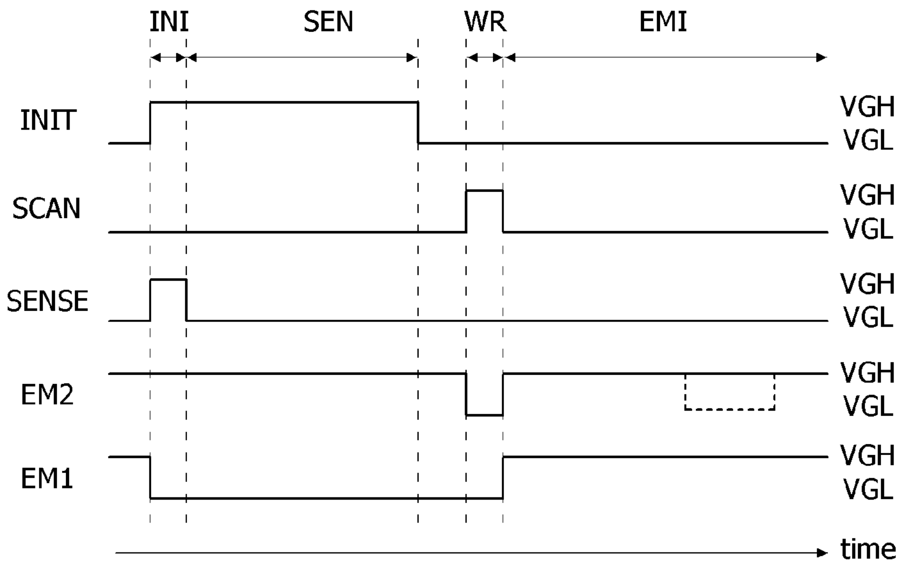
FIGS. 9A and 9B are waveform diagrams illustrating gate signals applied to the pixel circuit shown in FIG. 8 and voltages at main nodes thereof.
Figure 9B:
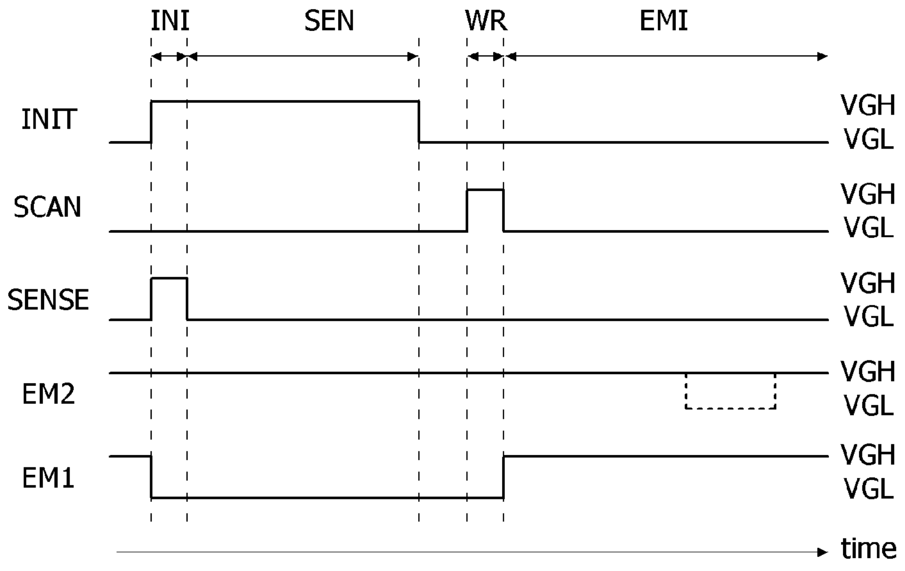

FIG. 8 is a circuit diagram illustrating a pixel circuit according to a fourth embodiment of this disclosure. FIGS. 9A and 9B are waveform diagrams illustrating gate signals applied to the pixel circuit shown in FIG. 8 and voltages at main nodes thereof according to one embodiment of the present disclosure. In this embodiment, the same reference numerals are assigned to the components substantially the same as those of the above-described embodiment, and a detailed description thereof will be omitted.

Referring to FIGS. 8, 9A, and 9B, a pixel circuit includes an emitting element EL, a driving element DT driving the emitting element EL, a plurality of switch elements T01 to T85, and a capacitor Cst. The driving element DT and the switch elements T01 to T85 may be implemented as n-channel oxide TFTs.

The pixel circuit is connected to a data line DL to which a data voltage VDATA is applied, and to gate lines GL1 to GL5 to which gate signals SCAN, SENSE, INIT, EM1, and EM2 are applied. The pixel circuit is connected to power nodes to which DC voltages (or constant voltages) are applied, such as a first voltage node PL1 to which a pixel driving voltage EVDD is applied, a second voltage node PL2 to which a cathode voltage EVSS is applied, and a third voltage node PL3 to which an initialization voltage VINIT is applied. On the display panel, the power lines to which the voltage nodes are connected may be commonly connected to all of pixels. The driving voltages applied to the pixels may be set to voltages that satisfy VGH>EVDD>VDATA White Max>VDATA Black>VINIT>EVSS>VGL.

The gate signals SCAN, SENSE, INIT, EM1, and EM2 include pulses that swing between the gate-on voltage VGH and the gate-off voltage VGL. The gate signals SCAN, SENSE, INIT, EM1, and EM2 include a first gate signal SCAN, a second gate signal SENSE, a third gate signal INIT, a fourth gate signal EM1, and a fifth gate signal EM2.

The operation period of the pixel circuit is divided into an initialization period INI, a sensing period SEN, a data writing period WR, and a light emission period EMI. The initialization period INI, the sensing period SEN, the data writing period WR, and the light emission period EMI may be determined by the waveforms of the gate signals SCAN, SENSE, INIT, EM1, and EM2 as shown in FIGS. 9A and 9B.

The voltage of the fourth gate signal EM1 is the gate-on voltage VGH during the light emission period EMI and is generated as a pulse of the gate-off voltage VGL during the initialization period INI, the sensing period SEN, and the data writing period WR. A fourth switch element T84 is turned on in response to the gate-on voltage VGH of the fourth gate signal EM1 during the light emission period EMI. The fourth switch element T84 includes a first electrode connected to the second node S, a gate electrode connected to the fourth gate line GL4 to which the fourth gate signal EM1 is applied, and a second electrode connected to the third node ANO.

The voltage of the fifth gate signal EM2 may be controlled as shown in FIG. 9A or FIG. 9B. When the mobility compensation of the driving element DT is not required, as shown in FIG. 9A, the voltage of the fifth gate signal EM2 is generated as a pulse of the gate-off voltage VGL during the data writing period WR and is the gate-on voltage VGH during periods, INI, SENS, EMI, other than the data writing period.

When the mobility compensation of the driving element DT is required, as shown in FIG. 9B, the voltage of the fifth gate signal EM2 is the gate-on voltage VGH even during the data writing period WR. The fifth switch element T85 is turned on in response to the gate-on voltage VGH of the fifth gate signal EM5. The fifth switch element T85 includes a first electrode to which the pixel driving voltage EVDD is applied, a gate electrode connected to a fifth gate line GL5 to which the fifth gate signal EM2 is applied, and a second electrode connected to the node D.

During the light emission period EMI, at least one of the fourth gate signal EM1 and the fifth gate signal EM2 may be generated as a pulse width modulation (PWM) pulse.

During the initialization period INI, the voltage of the second, third, and fifth gate signals SENSE, INIT, and EM2 is the gate-on voltage VGH and the voltage of the first and fourth gate signals SCAN and EM1 is the gate-off voltage VGL. Therefore, during the initialization period INI, the second, third, and fifth switch elements T02, T03, and T85 are turned on, and the first and fourth switch elements T01 and T84 are turned off. In the initialization period INI, the driving element DT may be turned on. The light emitting element EL is not emitted during the initialization period INI because the voltage between the cathode electrode and the anode electrode is 0 [V].

During the sensing period SEN, the voltage of the third and fifth gate signals INIT and EM2 is the gate-on voltage VGH, and the voltage of the first, second, and fourth gate signals SCAN, SENSE, and EM1 is the gate-off voltage VGL. During the sensing period SEN, the third and fifth switch elements T03 and T85 are turned on, and the other switch elements T01, T02, and T84 are turned off. At the end of the sensing period SEN, the threshold voltage Vth of the driving element DT is sampled and stored in the capacitor Cst.

During the data writing period WR, as shown in FIG. 9A, the voltage of the first gate signal SCAN is the gate-on voltage VGH, and the voltage of the other gate signals SENSE, INIT, EM1, and EM2 is the gate-off voltage VGL. During the data writing period WR, the first switch element T01 is turned on, and the second to fifth switch elements T02, T03, T84, and T85 are turned off. During the data writing period WR, the data voltage VDATA is applied to the first node G through the first switch element T01.

During the data writing period WR, the mobility M of the driving element DT may be compensated. In this case, as shown in FIG. 9B, the fifth gate signal EM2 is the gate-on voltage VGH during the data writing period WR. At this time, the fifth switch element T85 is turned on to supply the pixel driving voltage EVDD to the node D.

During the light emission period EMI, the voltage of the fourth and fifth gate signals EM1 and EM2 is the gate-on voltage VGH, and the voltage of the other gate signals SCAN, SENSE, and INIT is the gate-off voltage VGL. During the light emission period EMI, the driving element DT generates a current according to the gate-source voltage Vgs to drive the light-emitting element EL. During the light emission period EMI, the light-emitting element EL may be driven by a current flowing through the driving element DT to emit light at a brightness corresponding to a grayscale value of the pixel data.

The foregoing embodiments utilize an internal compensation circuit connected to the pixel circuit to compensate for the threshold voltage Vth of the driving element DT in real time. The present disclosure is not limited to the forgoing. For example, sub-pixels may be implemented with the pixel circuit illustrated in FIG. 10. This embodiment senses current on the power line to which the pixel driving voltage EVDD is applied in a sensing mode. The current of the power line varies depending on the amount of variation in the drain-source current Ids of the driving element. Based on the result of sensing the amount of variation in the current of the power line, i.e., the amount of variation in the drain-source current Ids of the driving element, the pixel data may be modulated to compensate for variations in the electrical characteristics of the sub-pixels. In sum, in various embodiments of the disclosure, through the designs of the structure of the pixel circuit, the voltage of the anode electrode of the light-emitting element EL may be controlled in the case of being not applied a reference voltage such that the light-emitting element EL is not emitted. That is, since there is no need for a wiring to which a reference voltage is applied and a switch element to switch the reference voltage in the pixel circuit, it is possible to compensate for deviations in the electrical characteristics of the driving element in real time and facilitate the high pixel aperture ratio and the high PPI design.

Figure 10:
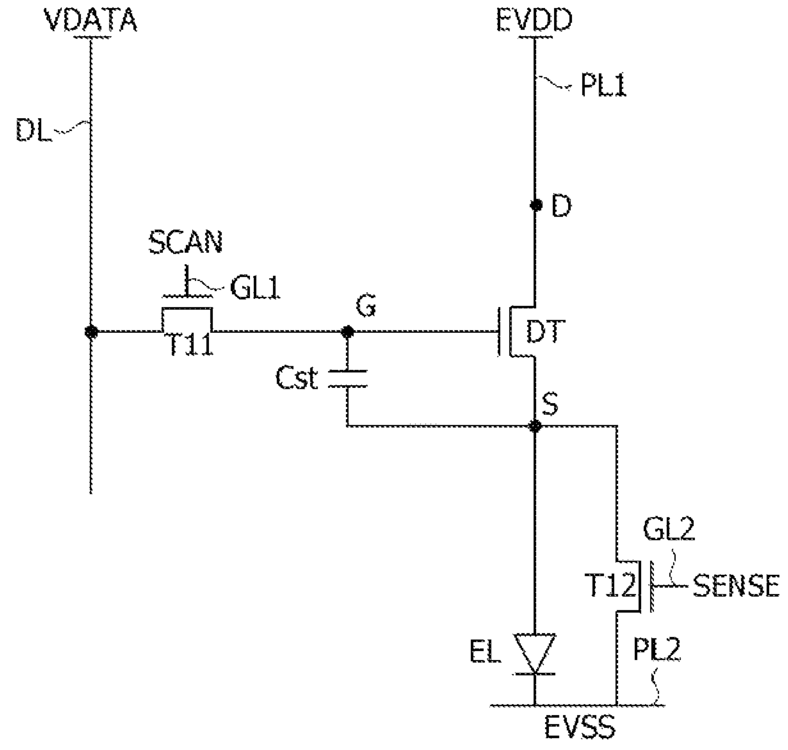
FIG. 10 is a circuit diagram illustrating a pixel circuit according to a fifth embodiment of this disclosure.
Figure 11:
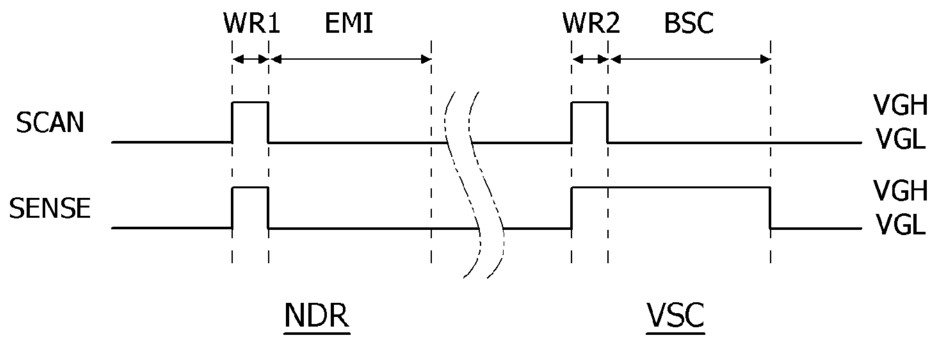
FIG. 11 is a waveform diagram illustrating gate signals applied to the pixel circuit shown in FIG. 10 and voltages at main nodes thereof according to one embodiment of the present disclosure.

FIG. 10 is a circuit diagram illustrating a pixel circuit according to a fifth embodiment of this disclosure. FIG. 11 is a waveform diagram illustrating gate signals applied to the pixel circuit shown in FIG. 10 and voltages at main nodes thereof according to one embodiment of the present disclosure. In this embodiment, the same reference numerals are assigned to the components substantially the same as those of the above-described embodiment, and a detailed description thereof will be omitted.

Referring to FIGS. 10 and 11, the pixel circuit includes a light emitting element EL, a driving element DT driving the light emitting element EL, a plurality of switch elements T11 to T12, and a capacitor Cst. The driving element DT and the switch elements T11 to T12 may be implemented as n-channel oxide TFTs.

The pixel circuit is connected to a data line DL to which a data voltage VDATA is applied, and to gate lines GL1 and GL2 to which gate signals SCAN and SENSE are applied. The pixel circuit is connected to a first voltage node PL1 to which the pixel driving voltage EVDD is applied, and a second voltage node PL2 to which a cathode voltage EVSS is applied. Power lines to which the voltage nodes PL1 and PL2 are connected may be commonly connected to all of pixels. The driving voltages applied to the pixels may be set to voltages that satisfy VGH>EVDD>VDATA White Max>VDATA Black>EVSS>VGL.

The gate signals SCAN and SENSE include pulses that swing between the gate-on voltage VGH and the gate-off voltage VGL. The gate signals SCAN and SENSE include a first gate signal SCAN and a second gate signal SENSE.

The driving element DT includes a first electrode connected to a node D, a gate electrode connected to a first node G, and a second electrode connected to a second node S. An anode electrode of the light emitting element EL is connected to a second node S, and a cathode electrode thereof is connected to the second voltage node PL2 to which the cathode voltage EVSS is applied. The capacitor Cst is connected between the first node G and the second node S.

In a data writing period WR1 of a normal driving mode NDR, a data voltage VDATA of pixel data of an input image is charged to the pixel circuit, and the pixel data is written to the pixel circuit. During a light emission period EMI of the normal driving mode NDR, the light emitting element EL of the pixel circuit may be emitted at a brightness corresponding to the grayscale value of the pixel data.

In a sensing mode VSC, the drain-source current Ids of the driving element DT is sensed. During a data writing period WR2 of a sensing mode VSC, a preset data voltage for sensing is charged to the pixel circuit regardless of the pixel data of the input image, and data for sensing is written to the pixel circuit. In the sensing mode VSC, the data for sensing may be written to a plurality of sub-pixels within a block having a predetermined size. Each of the blocks includes two or more sub-pixels (or pixel circuits). During a sensing scan period BSC of the sensing mode VSC, the second gate signal SENSE maintains the gate-on voltage VGH, so that the light emitting element EL cannot light up. Therefore, an amount of variation in the electrical characteristics of the driving element may be sensed in real time on a block-by-block basis while the sub-pixels are not emitting.

Since the data voltage for sensing is measured by collecting the currents flowing to the sub-pixels on a block-by-block basis through the power lines connected to all sub-pixels in the block, the data voltage for sensing may be set to a full white voltage or a full gray voltage of pure colors R, G, and B to increase the gate-source voltage Vgs of the driving element DT. The full white voltage is a maximum voltage of R, G, and B data applied to the R, G, and B sub-pixels. The full gray voltage of the pure colors is a maximum voltage applied to a sub-pixel having any one of R, G, and B colors.

A first switch element T11 is turned on in response to the gate-on voltage VGH of the first gate signal SCAN during the data writing periods WR1 and WR2. The first switch element T01 includes a first electrode connected to the data line DL to which the data voltage VDATA is applied, a gate electrode connected to a first gate line GL1 to which the first gate signal SCAN is applied, and a second electrode connected to the first node G.

A second switch element T12 is turned on in response to the gate-on voltage VGH of the second gate signal SENSE during the data writing period WR1 of the normal drive mode NDR, and is turned on in response to the gate-on voltage VGH of the second gate signal SENSE during the data writing period WR2 and the sensing scan period BSC of the sensing mode VSC. The second switch element T12 includes a first electrode connected to the second node S, a gate electrode connected to a second gate line GL2 to which the second gate signal SENSE is applied, and a second electrode connected to the second voltage node to which the cathode voltage EVSS is applied.

The second gate signal SENSE generated in the normal driving mode NDR includes a pulse that occurs simultaneously with the pulse of the first gate signal SCAN and has the same pulse width as the pulse of the first gate signal SCAN. In contrast, the second gate signal SENSE generated in the sense mode VSC includes a pulse that rises simultaneously with the pulse of the first gate signal SCAN and has a pulse width greater than the pulse of the first gate signal SCAN. The sensing scan period BSC may be set to a time at which all blocks in a display area AA are scanned in the sensing mode.

Figure 12:
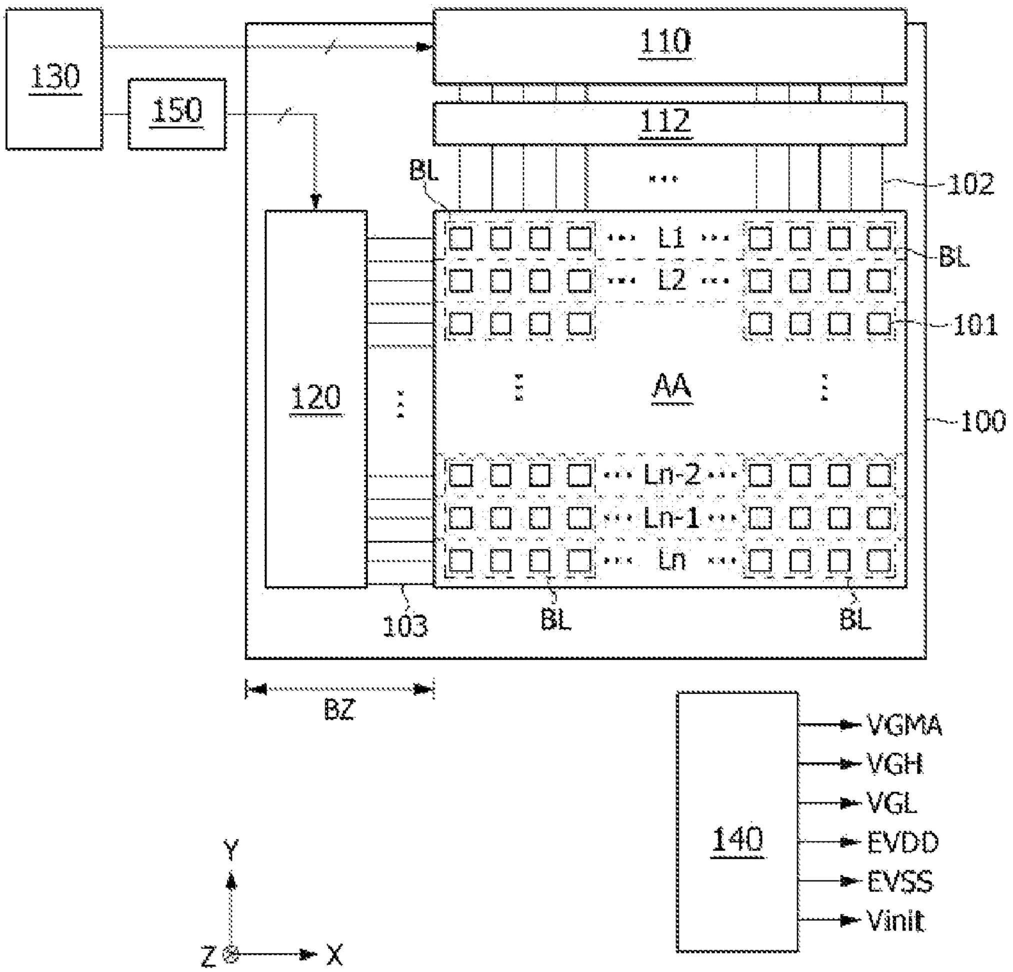
FIG. 12 is a block diagram illustrating a display device according to one embodiment of the present disclosure.
Figure 13:
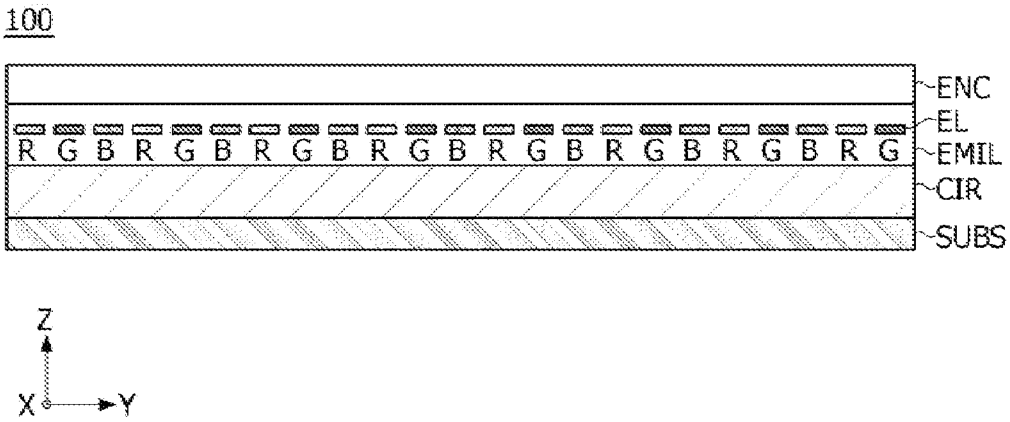
FIG. 13 is a cross-sectional view illustrating a cross-sectional structure of the display panel shown in FIG. 12 according to one embodiment of the present disclosure.

FIG. 12 is a block diagram illustrating a display device according to one embodiment of the present disclosure. FIG. 13 is a cross-sectional view illustrating a cross-sectional structure of the display panel shown in FIG. 12 according to one embodiment of the present disclosure.

Referring to FIGS. 12 and 13, the display device according to an embodiment of the present disclosure includes a display panel 100, a display panel driving circuit for writing pixel data to pixels of the display panel 100, and a power supply 140 for generating power necessary for driving the pixels and the display panel driving circuit.

The display panel 100 may be a panel having a rectangular structure with a length in the X-axis direction, a width in the Y-axis direction, and a thickness in the Z-axis direction. A display area of the display panel 100 includes a pixel array for displaying an input image thereon. The pixel array includes a plurality of data lines 102, a plurality of gate lines 103 intersecting with the data lines 102, and pixels arranged in a matrix form. The display panel 100 may further include power lines commonly connected to the pixels. The power lines are connected to constant voltage nodes of the pixel circuits and supply a constant voltage necessary for driving the pixels 101 to the pixels 101.

Each of the pixels 101 may be divided into a red sub-pixel, a green sub-pixel, and a blue sub-pixel for color implementation. Each of the pixels may further include a white sub-pixel. Each of the sub-pixels may be implemented with any of the pixel circuits described above. Each of the pixel circuits is connected to the data lines, the gate lines, and the power lines.

The pixels may be arranged as real color pixels and pentile pixels. A pentile pixel may realize a higher resolution than the real color pixel by driving two sub-pixels having different colors as one pixel 101 through the use of a preset pixel rendering algorithm. The pixel rendering algorithm may compensate for insufficient color representation in each pixel with the color of light emitted from an adjacent pixel.

The pixel array includes a plurality of pixel lines L1 to Ln. Each of the pixel lines L1 to Ln includes one line of pixels arranged along a line direction (X-axis direction) in the pixel array of the display panel 100. Pixels arranged in one pixel line share the gate lines 103. Sub-pixels arranged in a column direction Y along the data line direction share the same data line 102. One horizontal period is a time obtained by dividing one frame period by the total number of pixel lines L1 to Ln.

The display panel 100 may be implemented with a non-transmissive display panel or a transmissive display panel. The transmissive display panel may be applied to a transparent display device in which an image is displayed on a screen and an actual object in the background is visible. The display panel 100 may be manufactured as a flexible display panel.

The cross-sectional structure of the display panel 100 may include a circuit layer CIR, a light emitting element layer EMIL, and an encapsulation layer ENC that are stacked on a substrate SUBS, as shown in FIG. 13.

The circuit layer CIR may include a thin-film transistor (TFT) array including a pixel circuit connected to wirings such as a data line, a gate line, a power line, and the like, a de-multiplexer array 112, and a gate driver 120. The circuit layer CIR includes a plurality of metal layers insulated with insulating layers interposed therebetween, and a semiconductor material layer. All transistors formed in the circuit layer CIR may be implemented as an n-channel oxide TFT.

The light emitting element layer EMIL may include a light emitting element EL driven by the pixel circuit. The light emitting element EL may include a light emitting element of a red sub-pixel, a light emitting element of a green sub-pixel, and a light emitting element of a blue sub-pixel. The light emitting element layer EMIL may further include a light emitting element of white sub-pixel.

The light emitting element layer EMIL in each of the sub-pixels may have a structure in which the light emitting element and a color filter are stacked. The light emitting elements EL in the light emitting element layer EMIL may be covered by multiple protective layers including an organic film and an inorganic film.

The encapsulation layer ENC covers the light emitting element layer EMIL to seal the circuit layer CIR and the light emitting element layer EMIL. The encapsulation layer ENC may also have a multi-insulating film structure in which an organic film and an inorganic film are alternately stacked. The inorganic film blocks permeation of moisture and oxygen. The organic film planarizes the surface of the inorganic film. When the organic layer and the inorganic layer are stacked in multiple layers, the movement path of moisture and oxygen becomes longer than that of a single layer, so that penetration of moisture and oxygen affecting the light emitting element layer EMIL may be effectively blocked.

A touch sensor layer, not shown, may be formed on the encapsulation layer ENC, and a polarizing plate or a color filter layer may be disposed thereon. The touch sensor layer may include capacitive touch sensors that sense a touch input based on a change in capacitance before and after the touch input. The touch sensor layer may include metal wiring patterns and insulating films forming the capacitance of the touch sensors. The insulating films may insulate a portion where the metal wiring patterns intersect and may planarize the surface of the touch sensor layer. The polarizing plate may improve visibility and contrast ratio by converting the polarization of external light reflected by metal of the touch sensor layer and the circuit layer. The polarizing plate may be implemented as a polarizer in which a linear polarizer and a phase retardation film are bonded, or a circular polarizer. A cover glass may be adhered to the polarizing plate. The color filter layer may include red, green, and blue color filters. The color filter layer may further include a black matrix pattern. The color filter layer may replace the polarizing plate by absorbing a part of the wavelength of light reflected from the circuit layer and the touch sensor layer and increase the color purity of an image reproduced in the pixel array.

The power supply 140 generates DC voltages (or constant voltages) necessary for driving the pixel array of the display panel 100 and the display panel driving circuit using a DC-DC converter. The DC-DC converter may include a charge pump, a regulator, a buck converter, a boost converter, and the like. The power supply 140 may generate the constant voltages such as a gamma reference voltage VGMA, a gate-on voltage VGH, a gate-off voltage VGL, a pixel driving voltage EVDD, a low potential cathode voltage EVSS, an initialization voltage VINIT, and the like by adjusting the level of a DC input voltage applied from a host system, which is not shown. The gamma reference voltage VGMA is supplied to the data driver 110. The gate-on voltage VGH and the gate-off voltage VGL are supplied to a level shifter 150 and the gate driver 120. The constant voltages such as the pixel driving voltage EVDD, the cathode voltage EVSS and the initialization voltage VINIT are supplied to the pixels 101 through the power lines commonly connected to the pixels 101.

The pixel driving voltage EVDD may be outputted from a main power source of the host system and supplied to the display panel 100. In this case, the power supply 140 does not need to output the pixel driving voltage EVDD.

The display panel driving circuit writes pixel data of an input image to the pixels of the display panel 100 in the normal driving mode under the control of the timing controller 130.

The display panel driving circuit includes the data driver 110 and the gate driver 120. The display panel driving circuit may further include a de-multiplexer array 112 disposed between the data driver 110 and the data lines 102.

The de-multiplexer array 112 sequentially supplies the data voltages outputted from channels of the data driver 110 to the data lines 102 using a plurality of de-multiplexers DEMUX. The de-multiplexer may include a multiple of switch elements disposed on the display panel 100. When the de-multiplexer is disposed between the output terminals of the data driver 110 and the data lines 102, the number of channels of the data driver 110 may be reduced. The de-multiplexer array 112 may be omitted.

The display panel driving circuit may further include a touch sensor driver for driving touch sensors. The touch sensor driver is omitted from FIG. 12. The data driver 110 and the touch sensor driver may be integrated into one drive IC (Integrated Circuit). In a mobile device or a wearable device, the timing controller 130, the power supply 140, the level shifter 150, the data driver 110, the touch sensor driver, and the like may be integrated into one drive IC.

Figure 14:
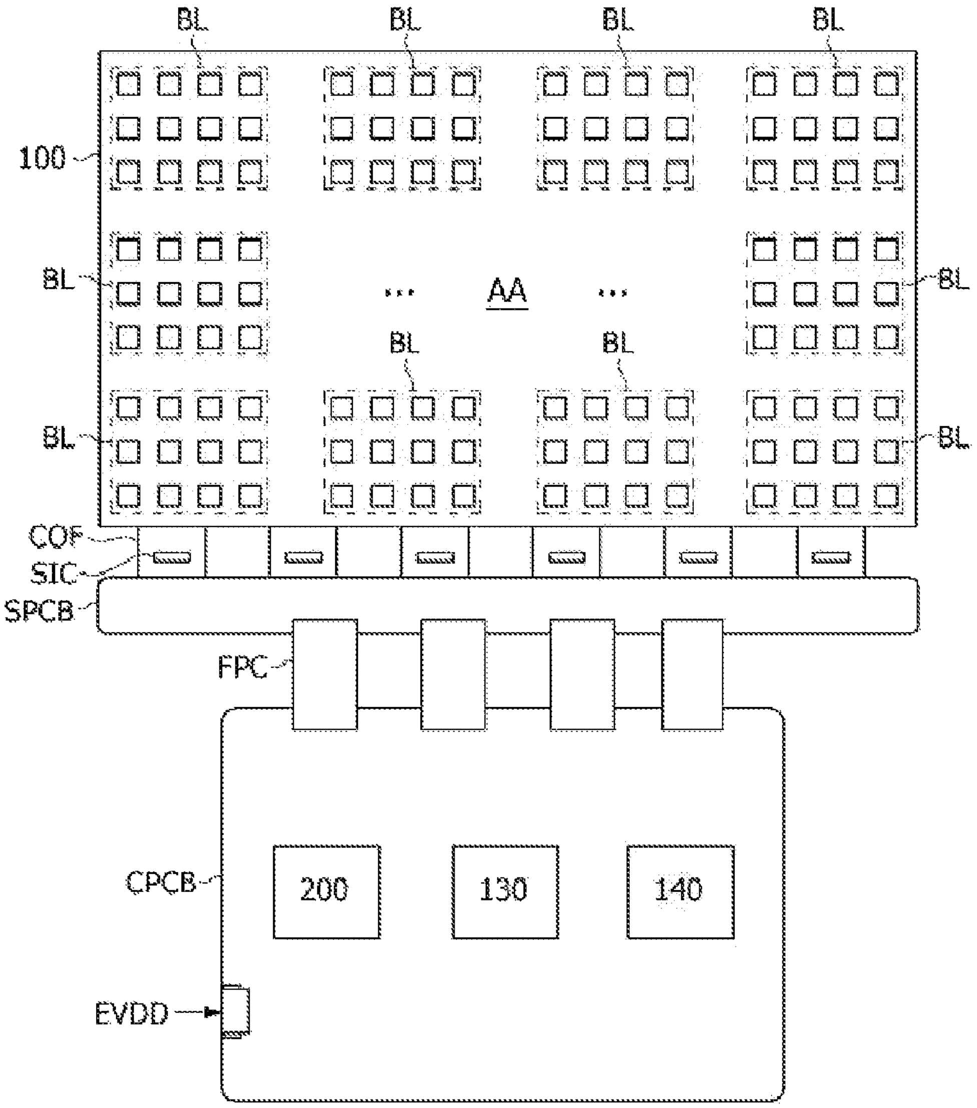
FIGS. 14 and 15 are diagrams illustrating an example of a sensing circuit according to one embodiment of the present disclosure.

The data driver 110 receives the pixel data of the input image received as a digital signal from the timing controller 130 and outputs the data voltage. The data driver 110 converts the pixel data of the input image into a gamma compensation voltage at every frame period in the normal driving mode using a digital-to-analogue converter (DAC) and outputs the data voltage VDATA. The gamma reference voltage VGMA is divided by a voltage divider circuit into a gamma compensation voltage for each grayscale. The gamma compensation voltage for each grayscale is provided to the DAC in the data driver 110. The data voltage VDATA is outputted through an output buffer from each of the channels of the data driver 110. In the sensing mode, the data driver 110 may convert the data for sensing received as a digital signal from the timing controller 130 into the gamma compensation voltage using the DAC to output the data voltage for sensing. The data driver 110 may be integrated on each of a plurality of drive ICs SIC, as shown in FIG. 14.

The gate driver 120 may be formed in the circuit layer CIR of the display panel 100 along with the TFT array and the wires of the pixel array. The gate driver 120 may be disposed in a bezel area BZ, which is non-display area of the display panel 100 or may be distributed and disposed in the pixel array in which the input image is reproduced.

The gate driver 120 may be disposed in the bezel area BZ on both sides of the display panel 100 with the display area of the display panel interposed therebetween and may supply gate pulses from both sides of the gate lines 103 in a double feeding method. In another embodiment, the gate driver 120 may be disposed on either the left or right bezel of the display panel 100 to supply gate signals to the gate lines GL in a single feeding method. The gate driver 120 sequentially outputs pulses of the gate signals to the gate lines 103 under the control of the timing controller 130. The gate driver 120 may sequentially supply the gate signals to the gate lines 103 by shifting pulses of the gate signals using a shift register.

The gate driver 120 may include a plurality of shift registers that output pulses of the gate signals. For the pixel circuit illustrated in FIG. 1, the gate driver 120 may include a first shift register that sequentially outputs the first gate signal SCAN, a second shift register that sequentially outputs the second gate signal SENSE, a third shift register that sequentially outputs the third gate signal INIT, and a fourth shift register that sequentially outputs the fourth gate signal EM.

The timing controller 130 receives the digital video data DATA of the input image from the host system and timing signals synchronized therewith. The timing signal may include a vertical synchronization signal Vsync, a horizontal synchronization signal Hsync, a clock CLK, and a data enable signal DE. Because a vertical period and a horizontal period may be known by counting the data enable signal DE, the vertical synchronization signal Vsync and the horizontal synchronization signal Hsync may be omitted. The data enable signal DE has a cycle of one horizontal period (1H).

The host system may be one of a television (TV) system, a tablet computer, a notebook computer, a navigation system, a personal computer (PC), a home theater system, a mobile device, a wearable device, and a vehicle system. The host system may scale the image signal from the video source to fit the resolution of the display panel 100 and may transmit the scaled image signal to the timing controller 130 together with the timing signal.

The timing controller 130 generates a data timing control signal for controlling the operation timing of the data driver 110, a control signal for controlling the operation timing of the de-multiplexer array 112, and a gate timing control signal for controlling the operation timing of the gate driver 120, based on the timing signals Vsync, Hsync, DE received from the host system. The timing controller 130 synchronizes the data driver 110, the de-multiplexer array 112, the touch sensor driver, and the gate driver 120 by controlling the operation timings of the display panel driving circuit.

The gate timing control signal generated from the timing controller 130 may be inputted to the shift registers of the gate driver 120 through the level shifter 150. The level shifter may receive the gate timing control signal as input and generate a start pulse and a shift clock to provide them to the gate driver 120.

The display panel driving circuit senses on a block-by-block basis the electrical characteristics of the pixels 101 in blocks BL divided in virtual on the display area AA of the display panel 100 in the sensing mode VSC under the control of the timing controller 130. In the sensing mode VSC, the electrical characteristics of the pixels 101 are sensed in a non-emission state.

The sensing mode VSC may be activated during at least one of the following periods: a power ON sequence from which the display device is powered on and the display panel driving circuitry begins to drive, a vertical blank VB period between frame periods, and a power OFF sequence from which the display panel driver is driven for a predetermined delay period immediately after the display device is powered off and then stops.

The sensing circuit 200 shown in FIG. 14 may sense the electrical characteristics of the sub-pixels in predetermined blocks BL on the screen of the display panel by sensing the current flowing on the power line to which the pixel driving voltage EVDD is applied in the sensing mode. The sensing circuit 200 transmits the current sensing value to the timing controller 130, and a compensation circuit in the timing controller 140 modulates the pixel data by adding or multiplying the compensation value corresponding to the current sensing value to the pixel data, thereby compensating for the variations in the electrical characteristics of the sub-pixels.

Figure 15:
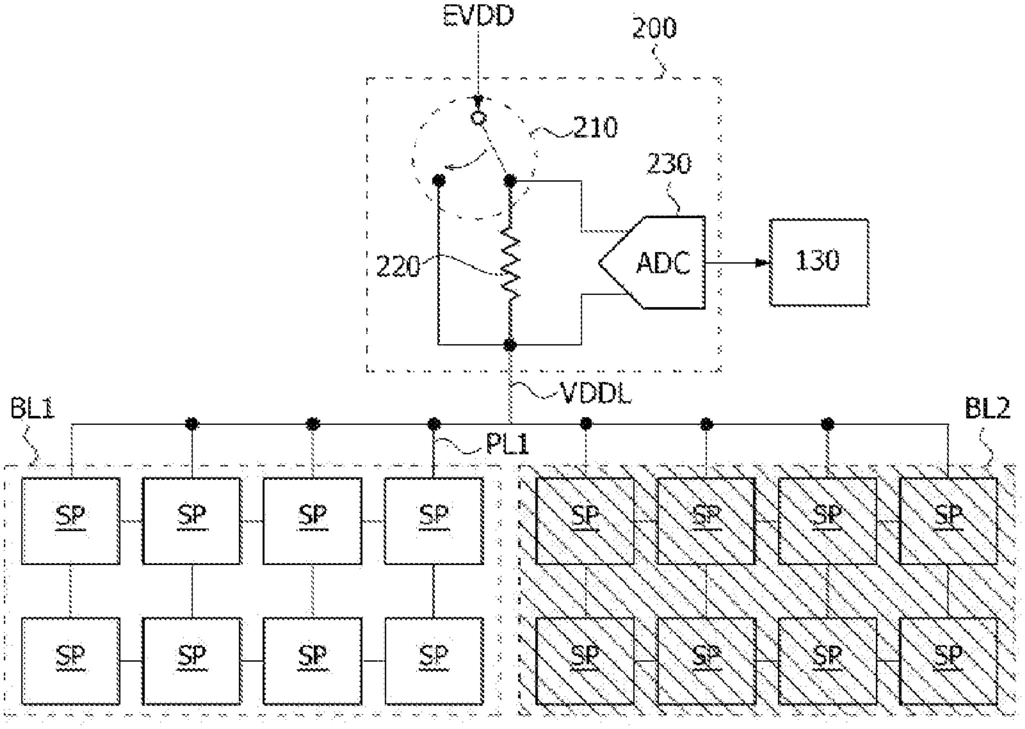

FIGS. 14 and 15 are diagrams illustrating an example of a sensing circuit according to one embodiment of the present disclosure.

Referring to FIGS. 14 and 15, a chip on film COF may be adhered to the display panel 100. The COF includes a drive IC SIC and connects a source board SPCB to the display panel 100.

The timing controller 130, the power supply 140, and the sensing circuit 200 may be mounted on a control board CPCB. The control board CPCB may be connected to a source board SPCB through a flexible circuit film, for example, a flexible printed circuit (FPC).

The sensing circuit 200 senses the current flowing to the sub-pixels SP of the block BL currently being scanned on the control board CPCB using a shunt resistor connected to the power line to which the pixel driving voltage ELVDD is applied in the sensing mode. The current sensing value (digital value) measured by the sensing circuit 200 is provided to the timing controller 130. The timing controller 130 may generate a compensation value corresponding to the current sensing data for each block received from the sensing circuit 200 and compensate for the electrical characteristics of the sub-pixels SP on a block-by-block basis by adding or multiplying the compensation value to the pixel data of the input image.

The sensing circuit 200 may include a switch element 210 that switches a pixel driving voltage ELVDD, a shunt resistor 220, and an analog-digital converter (ADC) 230. The switch element 210 applies the pixel driving voltage ELVDD directly to a power line VDDL to which the pixel driving voltage EVDD is applied in the normal drive mode NDR and connects the pixel driving voltage ELVDD to the shunt resistor 220 connected to the power line VDDL in the sensing mode VSC. The shunt resistor 220 and the ADC 230 serve as a current sensor. In sensing mode, the shunt resistor 220 is connected in series with the power line VDDL, and the ADC 230 converts the voltage difference across the shunt resistor 154 to a digital value and outputs the current sensing data.

Figure 16:
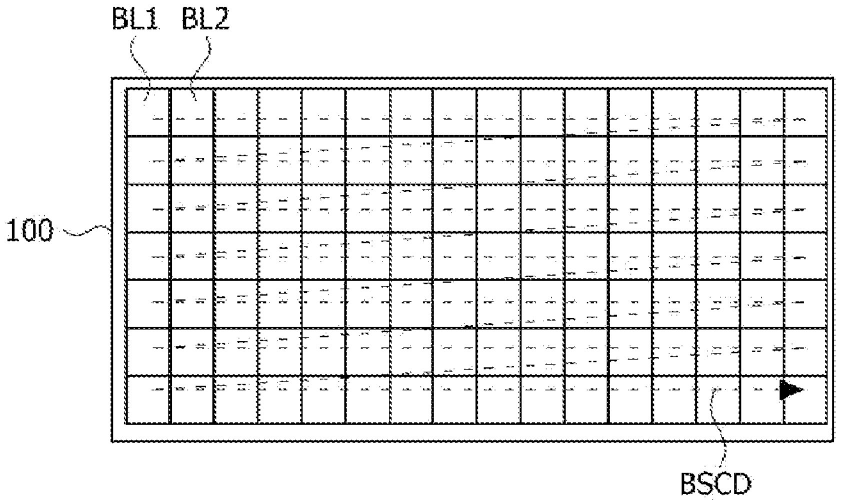
FIG. 16 shows an example of how sub-pixels are sensed on a block-by-block basis in a sensing mode.

FIG. 16 shows an example of how sub-pixels are sensed on a block-by-block basis in sensing mode.

Referring to FIGS. 15 and 16, the display area AA of the display panel 100 is virtually divided into blocks BL1 and BL2 having a predetermined size. Each of the blocks BL1 and BL includes a plurality of sub-pixels SP.

In the sensing mode, as the blocks BL1 and BL2 are scanned along a block scan direction BSCD, the data voltage for sensing is applied to the sub-pixels SP on a block-by-block basis. When the first block BL1 is sensed, the data voltage for sensing is applied to the sub-pixels SP in the first block BL1, and a black grayscale voltage is applied to the sub-pixels in the other block BL2. Since the driving elements DT are turned off in the sub-pixels to which the black grayscale voltage is applied, no current flows to the pixels 101 of the block BL2. Therefore, even if the power line VDDL is commonly connected to all of the sub-pixels SP of the display area AA, the current flowing to the sub-pixels SP only in the first block BL1 to which the data voltage for sensing is applied may be measured. After the first block BL1 is sensed, the second block BL2 is scanned and the second block BL2 is sensed when the second block BL2 is charged with the data voltage for sensing. When the second block BL2 is sensed, the black grayscale voltage is applied to the sub-pixels SP in the first block BL1.

The objects to be achieved by the present disclosure, the means for achieving the objects, and advantages and effects of the present disclosure described above do not specify essential features of the claims, and thus, the scope of the claims is not limited to the disclosure of the present disclosure.

Although the embodiments of the present disclosure have been described in more detail with reference to the accompanying drawings, the present disclosure is not limited thereto and can be embodied in many different forms without departing from the technical concept of the present disclosure. Therefore, the embodiments disclosed in the present disclosure are provided for illustrative purposes only and are not intended to limit the technical concept of the present disclosure. The scope of the technical concept of the present disclosure is not limited thereto. Therefore, it should be understood that the above-described embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A pixel circuit comprising:

a first voltage node to which a pixel driving voltage is applied;

a second voltage node to which a cathode voltage that is less than the pixel driving voltage is applied;

a driving element including a first electrode to which the pixel driving voltage is applied, a gate electrode connected to a first node, and a second electrode connected to a second node;

a light emitting element including an anode electrode and a cathode electrode, the light emitting element configured to be driven by a current from the driving element;

a capacitor connected between the first node and the second node;

a first switch element connected between a data line to which a data voltage is applied and the first node, the first switch element configured to be turned on in response to a first gate signal;

a second switch element connected between the second node and the second voltage node, the second switch element configured to be turned on in response to a second gate signal;

a third switch element connected between a third voltage node to which an initialization voltage is applied and the first node, the third switch element configured to be turned on in response to a third gate signal; and a fourth switch element connected between the second node and the anode electrode of the light emitting element, the fourth switch element configured to be turned on in response to a fourth gate signal, wherein the cathode electrode of the light emitting element is connected to the second voltage node.

2. The pixel circuit of claim 1, wherein the first switch element includes a first electrode connected to the data line, a gate electrode to which the first gate signal is applied, and a second electrode connected to the first node; and the second switch element includes a first electrode connected to the second node, a gate electrode to which the second gate signal is applied, and a second electrode connected to the second voltage node.

3. The pixel circuit of claim 1, wherein the third switch element includes a first electrode connected to the third voltage node, a gate electrode to which the third gate signal is applied, and a second electrode connected to the first node.

4. The pixel circuit of claim 1, wherein the pixel circuit is configured to be driven in an order of an initialization period, a sensing period, a data writing period, and a light emission period;

wherein a voltage of the first gate signal is generated as a pulse of a gate-on voltage synchronized with the data voltage during the data writing period, and is a gate-off voltage during the initialization period, the sensing period, and the light emission period;

wherein a voltage of the second gate signal is generated as a pulse of the gate-on voltage during the initialization period, and is the gate-off voltage during the sensing period, the data writing period, and the light emission period;

wherein a voltage of the third gate signal is generated as a pulse of the gate-on voltage during the initialization period and the sensing period, and is the gate-off voltage during the data writing period and the light emission period;

wherein the first switch element is configured to be turned on in response to the gate-on voltage of the first gate signal during the data writing period;

wherein the second switch element is configured to be turned on in response to the gate-on voltage of the second gate signal during the initialization period; and wherein the third switch element is configured to be turned on in response to the gate-on voltage of the third gate signal during the initialization period and the sensing period.

5. The pixel circuit of claim 1, wherein the fourth switch element includes a first electrode connected to the second node, a gate electrode to which the fourth gate signal is applied, and a second electrode connected to the anode electrode of the light emitting element.

6. The pixel circuit of claim 1, wherein the pixel circuit is configured to be driven in an order of an initialization period, a sensing period, a data writing period, and a light emission period;

wherein a voltage of the first gate signal is generated as a pulse of a gate-on voltage synchronized with the data voltage during the data writing period, and is a gate-off voltage during the initialization period, the sensing period, and the light emission period;

wherein a voltage of the second gate signal is generated as a pulse of the gate-on voltage during the initialization period, and is the gate-off voltage during the sensing period, the data writing period, and the light emission period;

wherein a voltage of the third gate signal is generated as a pulse of the gate-on voltage during the initialization period and the sensing period, and is the gate-off voltage during the data writing period and the light emission period;

wherein a voltage of the fourth gate signal is the gate-on voltage during the light emission period, and is generated as a pulse of the gate-off voltage during the initialization period, the sensing period, and the data writing period; and wherein each of the first switch element to the fourth switch element is configured to be turned on in response to the gate-on voltage.

7. The pixel circuit of claim 1, further comprising:

a fifth switch element connected between the first voltage node and the first electrode of the driving element, the fifth switch element configured to be turned on in response to a fifth gate signal.

8. The pixel circuit of claim 7, wherein the pixel circuit is configured to be driven in an order of an initialization period, a sensing period, a data writing period, and a light emission period;

wherein a voltage of the first gate signal is generated as a pulse of a gate-on voltage synchronized with the data voltage during the data writing period, and is a gate-off voltage during the initialization period, the sensing period, and the light emission period;

wherein a voltage of the second gate signal is generated as a pulse of the gate-on voltage during the initialization period, and is the gate-off voltage during the sensing period, the data writing period, and the light emission period;

wherein a voltage of the third gate signal is generated as a pulse of the gate-on voltage during the initialization period and the sensing period, and is the gate-off voltage during the data writing period and the light emission period;

wherein a voltage of the fourth gate signal is the gate-on voltage during the light emission period, and is the gate-off voltage during the initialization period, the sensing period, and the data writing period;

wherein a voltage of the fifth gate signal is the gate-on voltage during the initialization period, the sensing period, the data writing period, and the light emission period, or the gate-on voltage during the initialization period, the sensing period, and the light emission period, and is generated as a pulse of the gate-off voltage during the data writing period; and wherein each of the first switch element to the fifth switch element is configured to be turned on in response to the gate-on voltage.

9. The pixel circuit of claim 1, wherein the data voltage includes:

a pixel data voltage of an input image inputted in a normal driving mode; and a preset data voltage for sensing regardless of the input image in a sensing mode, wherein the second gate signal in the normal driving mode includes a pulse that is generated simultaneously with a pulse of the first gate signal and has a same pulse width as the pulse of the first gate signal; and wherein the second gate signal generated in the sensing mode includes a pulse that rises simultaneously with the pulse of the first gate signal and has a pulse width that is greater than a pulse of the first gate signal.

10. A pixel circuit comprising:

a first voltage node to which a pixel driving voltage is applied;

a second voltage node to which a cathode voltage that is less than the pixel driving voltage is applied;

a driving element including a first electrode to which the pixel driving voltage is applied, a gate electrode connected to a first node, and a second electrode connected to a second node;

a light emitting element including an anode electrode and a cathode electrode, the light emitting element configured to be driven by a current from the driving element;

a capacitor connected between the first node and the second node;

a first switch element connected between a data line to which a data voltage is applied and the first node, the first switch element configured to be turned on in response to a first gate signal;

a second switch element connected between the second node and the second voltage node, the second switch element configured to be turned on in response to a second gate signal;

a third switch element connected between a third voltage node to which an initialization voltage is applied and the first node, the third switch element configured to be turned on in response to a third gate signal; and a fourth switch element connected between the first voltage node and the first electrode of the driving element, the fourth switch element configured to be turned on in response to a fourth gate signal, wherein the cathode electrode of the light emitting element is connected to the second voltage node.

11. The pixel circuit of claim 10, wherein the pixel circuit is configured to be driven in an order of an initialization period, a sensing period, a data writing period, and a light emission period;

wherein a voltage of the first gate signal is generated as a pulse of a gate-on voltage synchronized with the data voltage during the data writing period, and is a gate-off voltage during the initialization period, the sensing period, and the light emission period;

wherein a voltage of the second gate signal is generated as a pulse of the gate-on voltage during the initialization period, and is the gate-off voltage during the sensing period, the data writing period, and the light emission period;

wherein a voltage of the third gate signal is generated as a pulse of the gate-on voltage during the initialization period and the sensing period, and is the gate-off voltage during the data writing period and the light emission period;

wherein a voltage of the fourth gate signal is the gate-on voltage during the initialization period, the sensing period, the data writing period, and the light emission period, or the gate-on voltage during the initialization period, the sensing period, and the data writing period, and is configured to swing between the gate-on voltage and the gate-off voltage at a predetermined duty ratio during the light emission period; and wherein each of the first switch element to the fourth switch element is configured to be turned on in response to the gate-on voltage.

12. A display device comprising:

a display panel comprising a plurality of data lines, a plurality of gate lines, a plurality of power lines, and a plurality of pixel circuits;

a data driver configured to output data voltages of pixel data to the plurality of data lines; and a gate driver configured to sequentially supply gate signals to plurality of gate lines, wherein each of the plurality of pixel circuits includes:

a first voltage node to which a pixel driving voltage is applied;

a second voltage node to which a cathode voltage that is less than the pixel driving voltage is applied;

a driving element including a first electrode to which the pixel driving voltage is applied, a gate electrode connected to a first node, and a second electrode connected to a second node;

a light emitting element including an anode electrode and a cathode electrode, the light emitting element configured to be driven by a current from the driving element;

a capacitor connected between the first node and the second node;

a first switch element connected between a data line from the plurality of data lines to which a data voltage from the data voltages is applied and the first node, the first switch element configured to be turned on in response to a first gate signal;

a second switch element connected between the second node and the second voltage node, the second switch element configured to be turned on in response to a second gate signal;

a third switch element connected between a third voltage node to which an initialization voltage is applied and the first node, the third switch element configured to be turned on in response to a third gate signal; and a fourth switch element connected between the second node and the anode electrode of the light emitting element, the fourth switch element configured to be turned on in response to a fourth gate signal, wherein the cathode electrode of the light emitting element is connected to the second voltage node.

13. The display device of claim 12, wherein the pixel circuit is configured to be driven in an order of an initialization period, a sensing period, a data writing period, and a light emission period;

wherein a voltage of the first gate signal is generated as a pulse of a gate-on voltage synchronized with the data voltage during the data writing period, and is a gate-off voltage during the initialization period, the sensing period, and the light emission period;

wherein a voltage of the second gate signal is generated as a pulse of the gate-on voltage during the initialization period, and is the gate-off voltage during the sensing period, the data writing period, and the light emission period;

wherein a voltage of the third gate signal is generated as a pulse of the gate-on voltage during the initialization period and the sensing period, and is the gate-off voltage during the data writing period and the light emission period;

wherein the first switch element is configured to be turned on in response to the gate-on voltage of the first gate signal during the data writing period;

wherein the second switch element is configured to be turned on in response to the gate-on voltage of the second gate signal during the initialization period; and wherein the third switch element is configured to be turned on in response to the gate-on voltage of the third gate signal during the initialization period and the sensing period.

14. The display device of claim 12, wherein the pixel circuit is configured to be driven in an order of an initialization period, a sensing period, a data writing period, and a light emission period;

wherein a voltage of the first gate signal is generated as a pulse of a gate-on voltage synchronized with a data voltage from the data voltages during the data writing period, and is a gate-off voltage during the initialization period, the sensing period, and the light emission period;

wherein a voltage of the second gate signal is generated as a pulse of the gate-on voltage during the initialization period, and is the gate-off voltage during the sensing period, the data writing period, and the light emission period;

wherein a voltage of the third gate signal is generated as a pulse of the gate-on voltage during the initialization period and the sensing period, and is the gate-off voltage during the data writing period and the light emission period;

wherein a voltage of the fourth gate signal is the gate-on voltage during the light emission period, and is generated as a pulse of the gate-off voltage during the initialization period, the sensing period, and the data writing period; and wherein each of the first switch element to the fourth switch element is configured to be turned on in response to the gate-on voltage.

15. The display device of claim 12, further comprising:

a fifth switch element connected between the first voltage node and the first electrode of the driving element, the fifth switch element configured to be turned on in response to a fifth gate signal.

16. The display device of claim 15, wherein the pixel circuit is configured to be driven in an order of an initialization period, a sensing period, a data writing period, and a light emission period;

wherein a voltage of the first gate signal is generated as a pulse of a gate-on voltage synchronized with a data voltage from the data voltages during the data writing period, and is a gate-off voltage during the initialization period, the sensing period, and the light emission period;

wherein a voltage of the second gate signal is generated as a pulse of the gate-on voltage during the initialization period, and is the gate-off voltage during the sensing period, the data writing period, and the light emission period;

wherein a voltage of the third gate signal is generated as a pulse of the gate-on voltage during the initialization period and the sensing period, and is the gate-off voltage during the data writing period and the light emission period;

wherein a voltage of the fourth gate signal is the gate-on voltage during the light emission period, and is the gate-off voltage during the initialization period, the sensing period, and the data writing period;

wherein a voltage of the fifth gate signal is the gate-on voltage during the initialization period, the sensing period, the data writing period, and the light emission period, or the gate-on voltage during the initialization period, the sensing period, and the light emission period, and is generated as a pulse of the gate-off voltage during the data writing period; and wherein each of the first switch element to the fifth switch element is configured to be turned on in response to the gate-on voltage.

* * * * *